(12) United States Patent
Kubecka et al.

(10) Patent No.: US 11,010,150 B2
(45) Date of Patent: May 18, 2021

(54) SYSTEM AND METHOD FOR PERFORMING DEVICE UPDATES

(71) Applicant: Oath Inc., New York, NY (US)

(72) Inventors: Jindrich Kubecka, Dublin (IE); Tony Finn, Dublin (IE); Nikita Sapozhnikov, Dublin (IE); Gordon Morrow, Dublin (IE)

(73) Assignee: Verizon Media Inc., New York, NY (US)

( * ) Notice: Subject to any disclaimer, the term of this patent is extended or adjusted under 35 U.S.C. 154(b) by 3 days.

(21) Appl. No.: 15/956,066

(22) Filed: Apr. 18, 2018

(65) Prior Publication Data

US 2019/0324736 A1  Oct. 24, 2019

(51) Int. Cl.
*G06F 8/65* (2018.01)
*G06F 11/14* (2006.01)

(52) U.S. Cl.
CPC ............ *G06F 8/65* (2013.01); *G06F 11/1433* (2013.01); *G06F 2201/865* (2013.01)

(58) Field of Classification Search
CPC .......... G06F 8/65; G06F 11/1433; G06F 8/60; G06F 8/61; G06F 8/62; G06F 11/2069; G06F 9/4411; G06F 9/45558; G06F 9/485; G06F 9/547; H04L 67/16; H06F 16/27
USPC ....................................................... 717/170
See application file for complete search history.

(56) References Cited

U.S. PATENT DOCUMENTS

| | | | | |
|---|---|---|---|---|
| 5,347,632 | A * | 9/1994 | Filepp et al. | G06F 8/60 709/202 |
| 2014/0028200 | A1* | 1/2014 | Van Wagoner et al. | G06F 8/65 717/171 |
| 2014/0250166 | A1* | 9/2014 | Desai | H04L 67/16 709/203 |
| 2015/0195164 | A1* | 7/2015 | Klein | G06F 8/60 709/224 |
| 2016/0344798 | A1* | 11/2016 | Kapila | G06F 8/60 |
| 2018/0157480 | A1* | 6/2018 | Ivanov et al. | G06F 8/65 |
| 2019/0028331 | A1* | 1/2019 | Kovacheva et al. | G06F 8/65 |
| 2019/0042290 | A1* | 2/2019 | Bailey et al. | G06F 8/60 |

* cited by examiner

*Primary Examiner* — Wei Y Zhen
*Assistant Examiner* — Mohammed N Huda
(74) *Attorney, Agent, or Firm* — Pillsbury Winthrop Shaw Pittman LLP

(57) ABSTRACT

Methods, systems, and programming for performing system updates are described herein. In a non-limiting embodiment, a first device from each of a plurality of rolls of devices may be downscaled, where each roll of devices is configured with information associated with that roll. Each first device may be updated with a new version of the information associated with a corresponding roll of devices, and each first device may be upscaled to the corresponding roll of devices. One or more additional devices from each of the plurality of rolls of devices may be downscaled, and, in parallel, each of the one or more additional devices may be updated with the new version of information associated with the corresponding roll of devices. Each of the one or more additional devices may then be upscaled to the corresponding roll of devices.

20 Claims, 20 Drawing Sheets

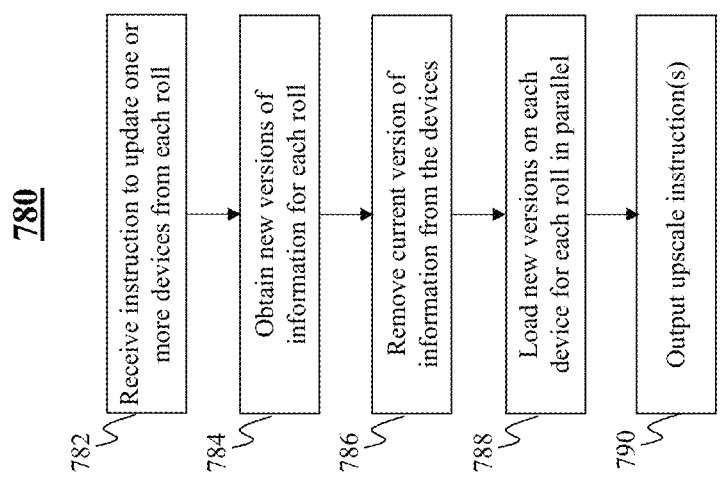

SYSTEM AND METHOD FOR PERFORMING DEVICE UPDATES

BACKGROUND

1. Technical Field

The present teaching generally relates to system platforms. More specifically, the present teaching relates to systems, methods, and programming for performing device updates.

2. Technical Background

Periodically, devices need to be updated. The reasoning for such updates may include new software for the device, security updates, and/or general performance upgrades (e.g., new operating systems). Additionally, some devices may store data that is used by other devices for analytics and various other functions. For example, forecasting estimates for advertisement purposes may employ data stored within memory on certain devices, which may be referred to as host devices. Node devices may access the data stored by the host devices for servicing queries. Forecasting estimates may indicate an amount of advertising an entity (e.g., a publisher of content) may have available at various points in time (e.g., a next day, a next week, etc.). These values may continually be updated based on prior exposure and interactions, as well as refinements to the algorithms used to compute such values.

The data that is stored on the host devices may be accessed, in some embodiments, from a data repository. The data repository may be cloud based—also referred to as cloud storage—and may take a certain amount of time to load on the host device. Furthermore, a requirement of such forecasting systems is that data is to be continually available to requesting devices. Bringing many hosts offline in order to perform updates can disrupt service to the masses. Further still, additional devices, which may be updated offline and swapped with online devices, is resource costly, requiring additional devices that may not be available. Yet even further, once a host device is updated with the new data, reliability checks are needed to be performed to ensure that the new data does not produce abnormalities.

With the above-mentioned issues in mind, there is a need for methods and systems that provide for fast data updates for host devices while also minimizing the resources needed to perform such updates.

SUMMARY

The teachings disclosed herein relate to methods, systems, and programming for performing system updates. More particularly, the present teaching relates to methods, systems, and programming related to performing system updates to devices in an efficient and expedient manner.

In one example, a method, implemented on at least one machine each having at least one processor, memory, and a communication platform connected to a network for performing system updates is described. The method may include: downscaling a first device from each of a plurality of rolls of devices, where each roll of devices is configured with information associated with that roll; updating each first device with a new version of the information associated with a corresponding roll of devices; upscaling each first device to the corresponding roll of devices; downscaling one or more additional devices from each of the plurality of rolls of devices; updating, in parallel, each of the one or more additional devices with the new version of information associated with the corresponding roll of devices; and upscaling each of the one or more additional devices to the corresponding roll of devices.

In another example, a system for performing system updates is described. The system may include a device downscaling system, a device updating system, and a device upscaling system. The device downscaling system may be configured to downscale a first device from each of a plurality of rolls of devices, wherein each roll of devices is configured with information associated with that roll. The device updating system may be configured to update each first device with a new version of the information associated with a corresponding roll of devices. The device upscaling system may be configured to upscale each first device to the corresponding roll of devices. The device downscaling system may be further configured to downscale one or more additional devices from each of the plurality of rolls of devices, the device updating system may be further configured to update, in parallel, each of the one or more additional devices with the new version of information associated with the corresponding roll of devices; and the device upscaling system is further configured to upscale each of the one or more additional devices to the corresponding roll of devices.

Other concepts relate to software for implementing the present teaching on performing system updates. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to retrieving content items for a search.

In one example, a machine-readable, non-transitory and tangible medium including instructions for performing system updates is described. The instructions, when executed by at least one processor of a computing system, may cause the computing system to: downscale a first device from each of a plurality of rolls of devices, wherein each roll of devices is configured with information associated with that roll; update each first device with a new version of the information associated with a corresponding roll of devices; upscale each first device to the corresponding roll of devices; downscale one or more additional devices from each of the plurality of rolls of devices; update, in parallel, each of the one or more additional devices with the new version of information associated with the corresponding roll of devices; and upscale each of the one or more additional devices to the corresponding roll of devices.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7C is an illustrative flowchart of another exemplary process for performing multiple device updates in parallel, in accordance with various embodiments of the present teaching;

DETAILED DESCRIPTION

Figure 1A:
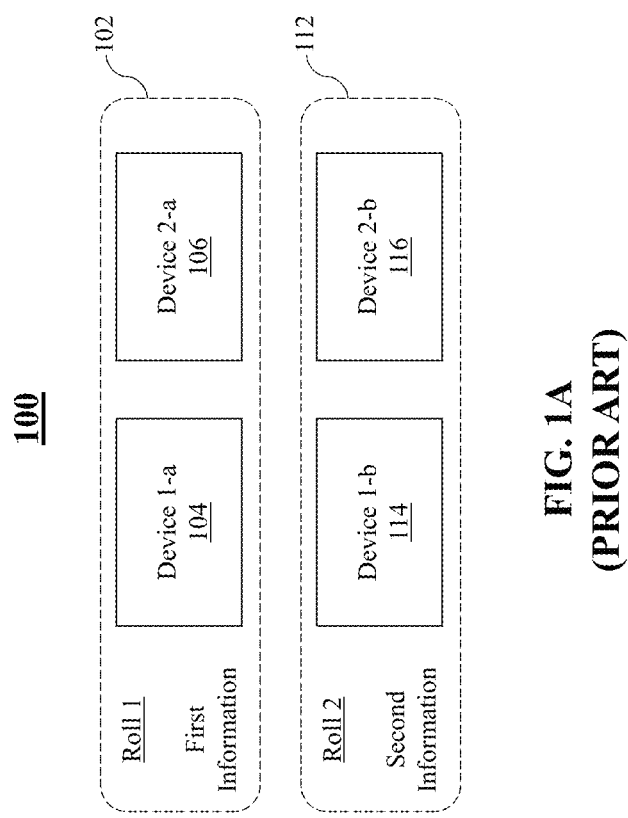
FIG. 1A is an illustrative diagram of an exemplary prior art system to be updated, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to eliminate the limitations of associated with previous device update systems and techniques, and subsequently produce devices with updated information while minimizing an amount of time needed to perform such updates, as well as minimizing a cost associated therewith. More specifically, the present teaching aims to describe systems, methods, and programming that yield significant improvements to previous techniques used for performing device updates, while also being scalable.

In some embodiments, devices may need to be updated with new information. This information may include any suitable form of data, such as operating system (OS) updates, application updates, configuration updates, rule updates, preference updates, and the like. As an illustrative example, a forecasting system may correspond to one type of system that may need periodic updates. A forecasting system, as described herein, corresponds to one exemplary system that provides information regarding how much advertising may be received by a web site in a next day (or two), a next week, etc. Generally speaking, if an individual wanted to purchase an item, such as a home, that individual may be able to determine how many homes are available for purchase within a particular area. The advertising forecasting system described previously operates on a similar philosophy in that an advertiser may need to know how much advertising will be available in the upcoming times. While the above-mentioned example refers to advertisement forecasting, a similar principle applies to any content-based system (e.g., one in which content is obtained and employed by devices).

Many systems where information needs to be loaded thereon have long start-up times. The amount of time needed to load the requisite information to that device, or devices, can affect the serviceability of the system as a while. For example, to update the information on a single device may range from anywhere between a few seconds to a few hours. The longer it takes to load information to a device, the longer it may take to update each device that is to store that information.

Many devices may be reading the information from one or more host devices. Typically, multiple instances of the information may reside on various host devices. If one host device is non-functional, overloaded, or otherwise incapacitated, one of the other host devices have the requested information may be queried. However, if all of the host devices need to be updated with a new version of the information, taking all of the devices offline together will cause any requesting device to be unable to obtain the necessary information.

Further complicating the above-mentioned issues is the requirement of ensuring that the newly updated devices provide accurate results. When updating a device, one or more tests should be performed post information loading to make sure that the new version of the information works appropriately. This further contributes to the amount of time needed for device updates.

In an ideal scenario, an infinite amount of secondary resources would be available. Here, all of the new versions of information could be loaded on the secondary resources, and then tested to ensure that the new versions operate correctly. If so, the secondary resources could be swapped with the existing devices at a substantially same time. However, these additional resources are costly, and thus are not viable as solutions. Therefore, there is a need to provide systems, methods, and programming that facilitate a cost-effective and efficient manner for updating multiple host devices.

FIG. 1A is an illustrative diagram of an exemplary prior art system to be updated, in accordance with various embodiments of the present teaching. System 100 of FIG. 1A corresponds to an exemplary prior art system including a first roll 102 of devices (e.g., "Roll 1"), each having first information stored thereon, and a second roll 112 of devices (e.g., "Roll 2"), each having second information stored thereon. For instance, roll 102 may include a first device 104 (e.g., device 1-*a*) and a second device 106 (e.g., device 2-*a*). The first information may be stored in memory of devices 104 and 106, and may be substantially similar for both devices. In other words, a same query directed to either of devices 104 or 106 would result in a same response from both devices 104 and 106. Similarly, roll 112 may include a first device 114 (e.g., device 1-*b*) and a second device 116 (e.g., device 2-*b*). The second information may be stored in memory of devices 114 and 116, and may be substantially similar for both devices.

The first and second information may, in some embodiments, correspond to data specific to a particular roll of devices. For example, the data stored by devices 104 and 106 of first roll 102 may correspond to data associated with a first forecasting parameter (e.g., clothing advertisement information), while the data stored by devices 114 and 116 of second roll 112 may correspond to data associated with a second forecasting parameter (e.g., restaurant advertisement information). In order for system 100 (e.g., a forecasting system) to be fully operational, at least one device from each roll needs to be operational. Therefore, in FIG. 1A, at least one of devices 104 and 106, and at least one of devices 114 and 116, needs to be functional in order for system 100 to be operational. Therefore, if an update to the first information and the second information is needed to be performed, then taking all of the devices out of service and updating all of the devices will render system 100 non-operational.

Figure 1B:
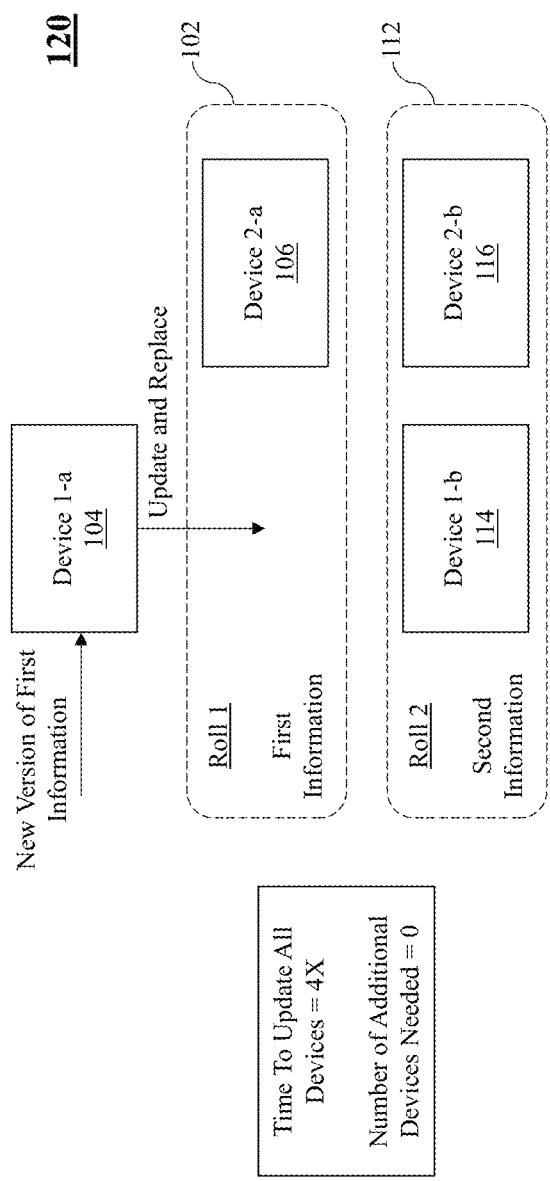
FIG. 1B is an illustrative diagram of an exemplary prior art system using a rolling installation for performing device updates, in accordance with various embodiments of the present teaching.

FIG. 1B is an illustrative diagram of an exemplary prior art system using a rolling installation for performing device updates, in accordance with various embodiments of the present teaching. In FIG. 1B, an exemplary prior art system 120 is illustrated. In system 120, an update to each of the devices included within system 100 of FIG. 1A is described. As an illustrative embodiment, a new version of the first information may become available. In this particular example, first device 104 of first roll 102 may be downscaled and updated with the new version of the first information. For instance, downscaling first device 104 may correspond to preventing any incoming queries from being directed to device 104, and alternatively routing those queries to second device 106 (or any other device of roll 102).

Upon being downscaled, the first information may be removed from memory of first device 104, and the new version of the first information may be loaded thereon. The new version of the information may be checked using one or more reliability checks to ensure that the new version of the first information will properly service any incoming queries. If the new version passes the test(s), then first device 104 may be upscaled back to first roll 102. Upscaling first device 104 may correspond to allowing incoming queries to be direct to device 104 such that device 104 (and/or any other device from roll 102) may be used to respond to an incoming query.

The process described by FIG. 1B, which may be referred to as a "rolling install," allows for each device within system 120 to be updated one at a time. In other words, after first device 104 is downscaled, updated, and upscaled, second device 106 of first roll 102 may be downscaled, updated with the new version of the first information, and then upscaled back to first roll 102. Similarly, after device 106 is updated and upscaled, first device 114 of second roll 112 may be downscaled and updated with a new version of the second information. First device 114 may be checked by having one or more tests performed thereto, and if those tests are passed, then first device 114 may be upscaled back to second roll 112. Afterword, second device 116 of second roll 112 may similarly be downscaled, updated, and upscaled. If any of the tests performed to the new version of the first information, or the new version of the second information, are not passed, then the new version of the first/second information may be removed from the corresponding device, and that device may be returned to the previous operational state (e.g., the first information for devices from roll 102 or the second information from roll 112).

In the rolling install process of FIG. 1B, no additional devices are needed (e.g., no additional computing resources). However, if the time to downscale, update, test, and then upscale is denoted as "X," then the amount of time to update system 120 would be 4X. If system 120 were to include more devices and/or more rolls, then the amount of time to update the system would further expand. For example, if there were three rolls, each including three devices, then a rolling install would take 9X to fully update, where again X is an amount of time need update one device. Furthermore, persons of ordinary skill in the art will recognize that the amount of time needed to update devices from different rolls may vary, and so the time to update system 120 may be more or less than 4X (or 9X for a three device, three roll system), however the aforementioned is merely meant to serve as an example.

Figure 1C:
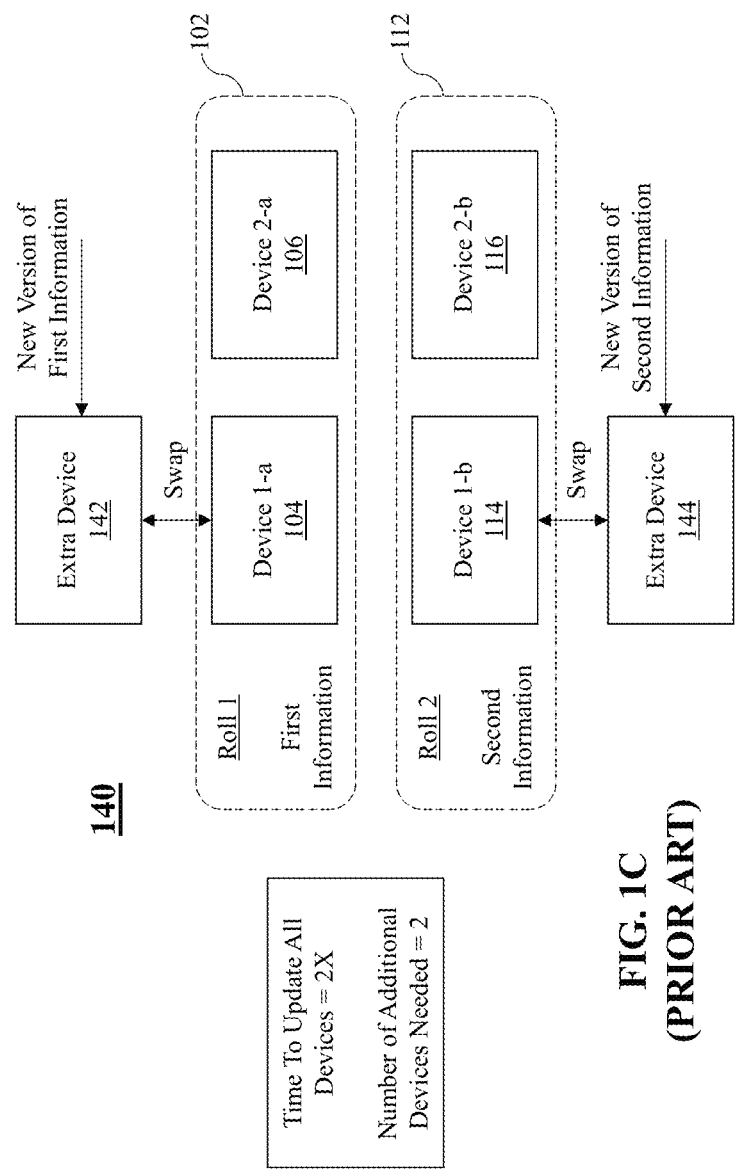
FIG. 1C is an illustrative diagram of an exemplary prior art system using a blue/green installation process for performing device updates, in accordance with various embodiments of the present teaching.

FIG. 1C is an illustrative diagram of an exemplary prior art system using a blue/green installation process for performing device updates, in accordance with various embodiments of the present teaching. In FIG. 1C, an exemplary prior art system 140 is illustrated. System 140 may employ a "blue/green installation," or "blue/green deployment," to update the various devices included within the system. System 140 may include two rolls of devices, each roll including two devices, similar to that of FIG. 1A. However, system 140 may also include two additional devices, first extra device 142 and second extra device 144. In the illustrated embodiment, upon determining that new versions of the first information and/or the second information are available, the blue/green installation process may begin.

In the blue/green installation process, the new version of the first information may be loaded to first extra device 142. Additionally, the new version of the second information may be loaded to second extra device 144. In some embodiments, the new version of the first information and the new version of the second information may be loaded to first and second extra devices 142 and 144, respectively, in parallel. One or more tests may be performed on the new version of the first information and the new version of the second information.

If those tests pass, then system 140 may be capable of using first extra device 142 and second extra device 144 for updating system 140.

To perform the update to system 140, therefore, upon determining that the one or more tests are passed, first device 104 of first roll 102 may be swapped out and replaced with first extra device 142. Similarly, second device 114 of second roll 112 may be swapped out and replaced with second extra device 142. Now, first roll 102 includes one device (e.g., first extra device 142) having the new version of the first information, and one device (e.g., second device 106) having the (previous) first information. Similarly, second roll 112 include one device (e.g., second extra device 144) having the new version of the second information, and one device (e.g., second device 116) having the (previous) second information. Additionally, first device 104 and first device 114 are now, essentially, "extra" devices. A similar update and swap procedure may be employed with these devices, thereby replacing devices 106 and 116, respectively, with devices 104 and 114, respectively, after the latter have been updated with the new versions of the first and second information, respectively.

The aforementioned process may reduce an amount of time needed to update system 140 as compared to the rolling installation of FIG. 1B. For instance, the amount of time to update the four devices of system 120 of FIG. 1B may have been 4X, where X corresponds to an amount of time needed to update a single device. In system 140 of FIG. 1C, however, the amount of time needed to update the four devices is reduced to 2X. However, the process employed by system 140 (e.g., blue/green install) may require two additional devices. Thus, the computing resources required to perform a blue/green installation, while faster than the rolling install, is a more costly endeavor. This is especially true for a system with even more rolls of devices.

Thus, in accordance with various embodiments of the present teaching, systems, methods, and programming for updating a system of devices is described that reduces an amount of time for the installation/updating with respect to a rolling install, while also not requiring any additional computing resources.

Figure 2A:
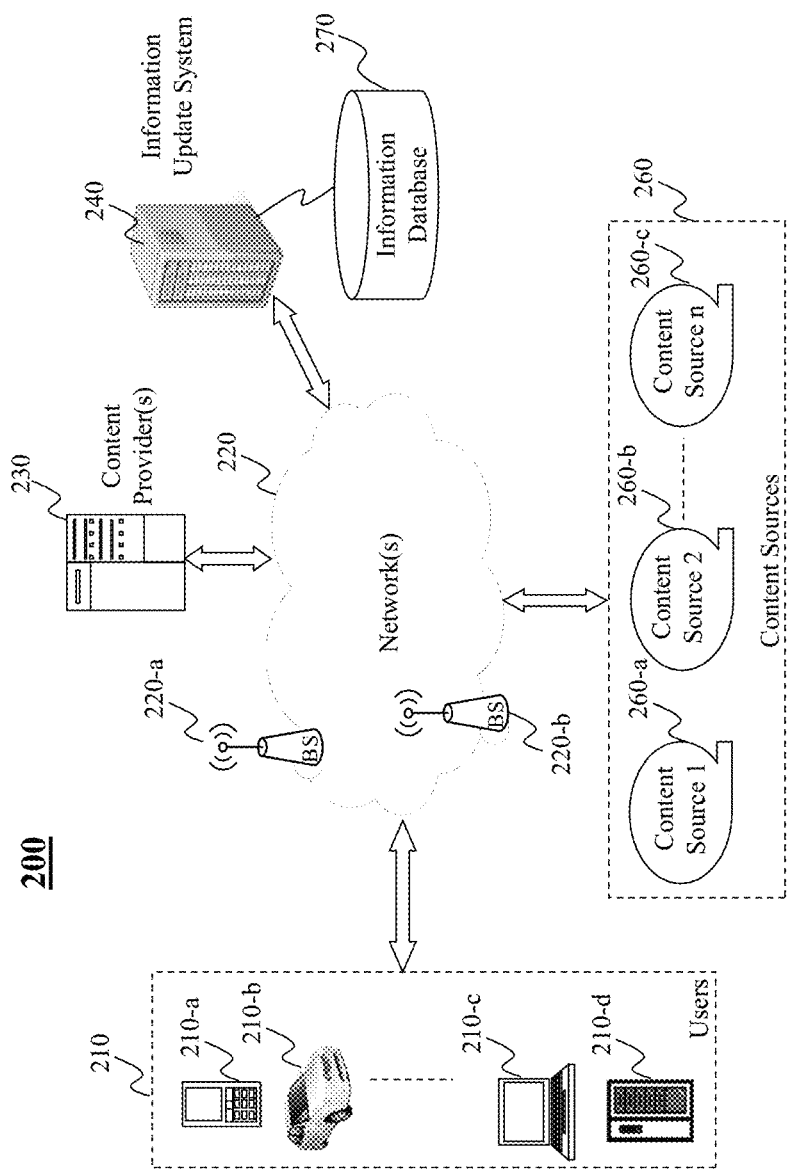
FIGS. 2A and 2B are illustrative diagrams of exemplary network environments for facilitating information updates, in accordance with various embodiments of the present teaching.
Figure 2B:
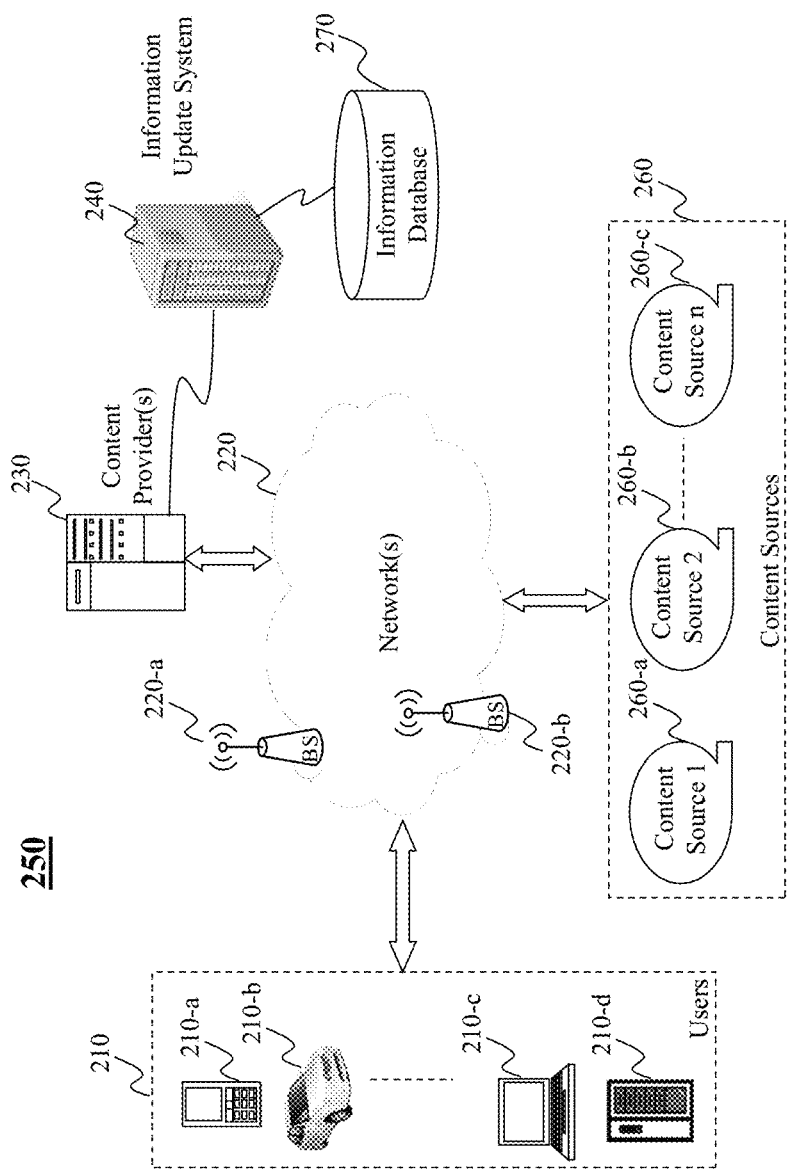

FIGS. 2A and 2B are illustrative diagrams of exemplary network environments for facilitating information updates, in accordance with various embodiments of the present teaching. In FIG. 2A, an exemplary networked environment 200 is described. Exemplary networked environment 200 may include one or more user devices 210, such as user devices 210-*a*, 210-*b*, 210-*c*, and 210-*d*, one or more content sources 260, one or more content providers 230, an information update system 240, and an information database 270, each of which may communicate with one another via one or more networks 220.

Network(s) 220, in some embodiments, may correspond to a single network or a combination of different networks. For example, network(s) 220 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 220 may also include various network access points. For example, environment 200 may include wired and/or wireless access points such as, and without limitation, base stations or Internet exchange points 220-*a* and 220-*b*. Base stations 220-*a* and 220-*b* may facilitate, for example, communications to/from user device(s) 210 and/or information update system 240 with one another as well as, or alternatively, one or more other components of environment 200 across network(s) 220.

User devices 210 may be of different types to facilitate one or more users operating user devices 210 to connect to network(s) 220. User devices 210 may correspond to any suitable type of electronic/computing device including, but not limited to, desktop computers 210-*d*, mobile devices 210-*c* (e.g., mobile phones, smart phones, personal display devices, personal digital assistants ("PDAs"), gaming consoles/devices, wearable devices (e.g., watches, pins/broaches, headphones, etc.), transportation devices 210-*b* (e.g., cars, trucks, motorcycles, boats, ships, trains, airplanes), mobile computers 210-*c* (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a query) and/or receive data (e.g., a response) via user devices 210.

Content sources 260 may include one or more content sources 260-1, 260-2, and 260-3, in some embodiments. Although three content sources are shown within environment 200, any number of content sources may be included. Content sources 260 may correspond to any suitable content source, such as, and without limitation, an individual, a business, an organization, and the like. For example, content sources 260 may correspond to a government website, a news site, a social media website, and/or a content feed source (e.g., a blog). In some embodiments, content sources 260 may be vertical content sources. In one embodiment, each content source 260 may be configured to generate and send content to one or more of user devices 210 via network(s) 220. The content (e.g., a webpage) may include information consumable by a user via their user device 210.

Information update system 240 may, in some embodiments, be configured to determine when a new version of data is available within an information database 270, and facilitate an update to one or more devices with that new version of data. As described herein, a device may include "information," "data," "code," "software," and the like, which at various times may be updated, modified, and/or replaced. Information update system 240 may facilitate detection of the new version of the information, and may further facilitate the updating of that device with the new version of the information. In some embodiments, the devices may correspond to one or more content providers 230.

Content provider(s) 230 may correspond to one or more publishers that publish content and/or advertisements. For example, providers 230 may be configured to present content obtained from one or more of content sources 260. In some embodiments, providers 230 may present one or more advertisements thereon, which may be selected from an advertisement database, an advertisement source, and/or any other suitable source. In some embodiments, providers 230 configured to provide product(s) and/or service(s), and may be configured to handle the advertising process for its own product(s) and/or a service (e.g., websites, mobile applications, etc.) related to advertising, or a combination thereof. For example, providers 230 may include such systems as an advertising agency or a dealer of advertisement that operates a platform that connects an advertiser or advertising agency one or more additional entities. Furthermore, in some embodiments, content providers 230 may be configured to store information within memory that indicates how various queries sent from user devices 210, or any other devices, are to be handled, and may facilitate responses to those queries based on the stored information. As an illustrative example, the content providers 230 may form, in part at least, a forecasting system, used to define rules for forecasting advertisement information for advertisers. Upon detection of new information for one or more of the content providers 230—which may also be referred to as host devices herein interchangeably—information update system 240 may retrieve the new information from information database 270, and may cause the host devices to be updated with the new information.

Additionally, information update system 240 may be configured to perform one or more checks to new information stored within information database 270. The one or more checks, also referred to herein as tests, may ascertain whether the new information provides accurate results to queries that will be received by the one or more host devices. If the checks/tests pass, the updating process may begin and/or continue; however if the checks/tests do not pass, information update system 240 may retrieve a prior version of the information for a particular host device from information database 270, and may update that host device with the prior version of the information.

Networked environment 250 of FIG. 2B, in one illustrative embodiment, may be substantially similar to networked environment 200 of FIG. 2A, with the exception that information update system 240 may connect to content provider(s) 230 as a backend as opposed to via network(s) 220. Still, in other embodiments, information database 270 may also connect to content sources 260 and/or content providers 230 as a backend, as opposed to via network(s) 220. Persons of ordinary skill in the art will recognize that one or more features of information update system 240 and/or information database 270 may be stored locally by user device(s) 210.

Figure 3:
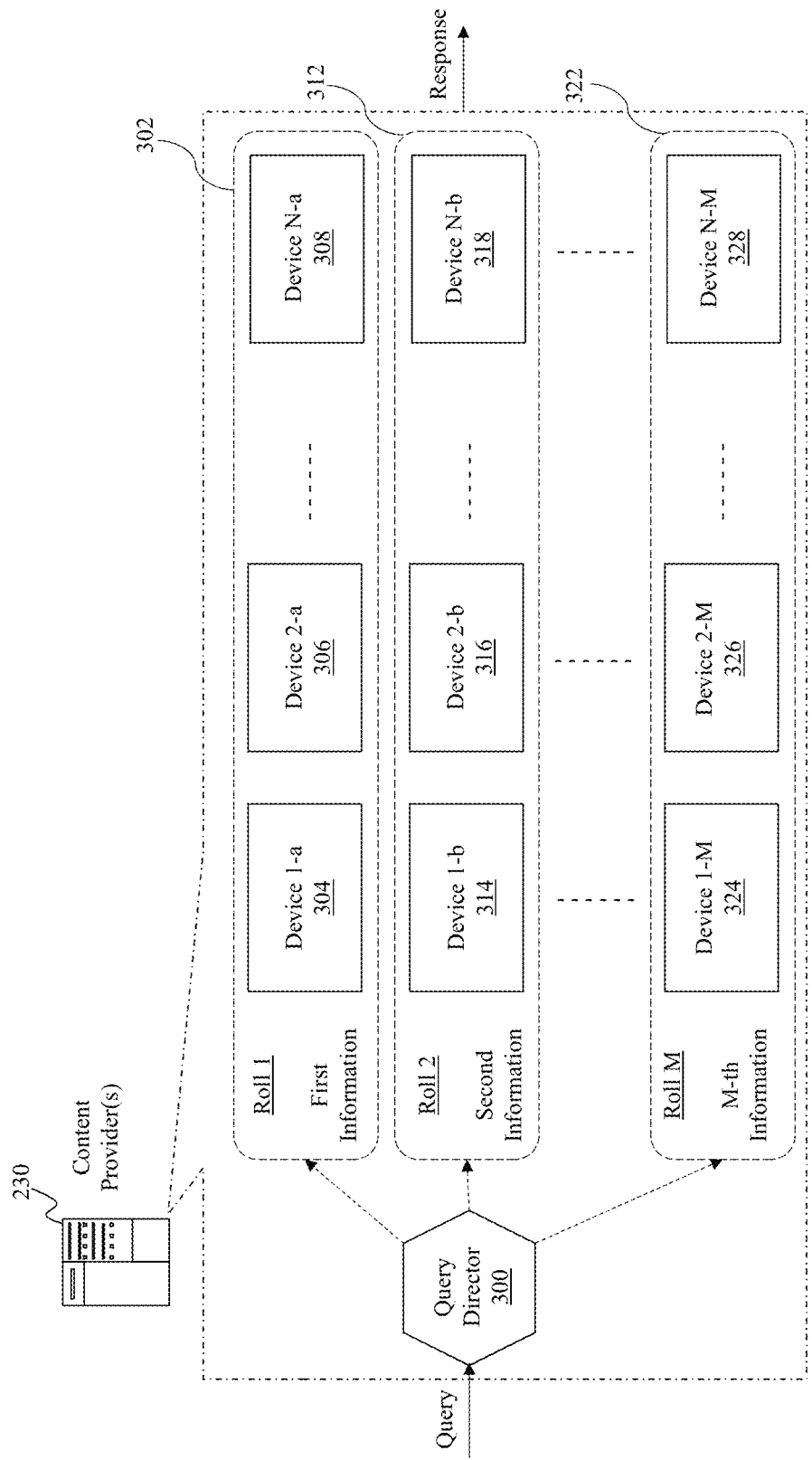
FIG. 3 is an illustrative diagram of an exemplary content provider including multiple rolls of host devices, in accordance with various embodiments of the present teaching.

FIG. 3 is an illustrative diagram of an exemplary content provider including multiple rolls of host devices, in accordance with various embodiments of the present teaching. In FIG. 3, content providers 230 is illustrated including a plurality of host devices. For instance, content providers 230 may include a query director 300, a first roll of devices 302, a second roll of devices 312, and an M-th roll of devices 322. Each roll of devices 302, 312, and 322 includes a plurality of devices. For example, first roll of devices 302 may include a first device 304, a second device 306, and an N-th device 308; second roll of devices 312 may include a first device 314, a second device 316, and an N-th device 318; and M-th roll of devices 322 may include a first device 324, a second device 326, and an N-th device 328. Persons of ordinary skill in the art will recognize that any suitable amount of rolls of devices may be included, and each roll may include any suitable amount of devices. In one embodiment, each roll may include at least two devices for redundancy as well as ensuring that if one devices becomes non-operational, the other device is able to service incoming queries.

The devices included within each of rolls 302, 312, and 322 may include information stored within memory on those devices. Each roll's devices may, in one embodiment, include the same information (e.g., the same data). For instance, devices 304, 306, and 308 of first roll 302 may include first information; devices 314, 316, and 318 of second roll 312 may include second information; and devices 324, 326, and 328 of M-th roll 322 may include M-th information. The specifics of the information (e.g., data) stored by each device may be substantially similar, in one embodiment, however this is not required, as the information stored on the devices in each roll may vary between rolls. In one example embodiment, the first information, second information, and M-th information may relate to forecasting data for identifying, quantifying, and/or analyzing advertisement queries.

As an illustrative example, each device may include information associated with the corresponding roll of devices that that device is part of In some embodiments, the information may include, amongst other features, compiled code data representing compiled code, configuration data, and log data. The compiled code data representing the compiled code may, for instance, correspond to computer program code/instructions used to run one or more applications on that device. As an illustrative example, the compiled code data may be a Java Archive File ("JAR") including all dependencies bundled therein. The device, upon execution of the compiled code, load and manage the forecasting data into that device's memory. Additionally, the compiled code data may be used to perform Boolean operation across the forecasting data stored within the device's memory at a time of query. The configuration data may correspond to property configurations used to alter application behaviors without changing the compiled code data. The log data may correspond to processed advertising log information stored in partitions (e.g., bitsets) in the corresponding device's memory of the application. The log data may be loaded onto the device at startup. Within each partition may be a basis for producing the advertising forecasts.

When a query is received from one of user devices 210 or from any other device requesting information stored within one of the devices of content providers 230, the query may initially be received by query director 300. Query director 300 may include processing functionality, memory, and communication functionality that enables query director 300 to receive incoming queries and direct the queries to a device within one of the various rolls of devices (e.g., rolls 302, 312, and/or 322). In some embodiments, the incoming query may include metadata and/or other information that indicates a subject/topic/address of that query. Query director 300 may include a look-up table, index, and/or directory that allows the query to be routed to an appropriate roll of devices based on the metadata/information. Upon forwarding the query to an appropriate roll of devices, one or more load balancers or other distributing mechanisms may provide the query to one of the devices included within that roll of devices. Using the information stored within that device's memory (e.g., the first information, second information, M-th information), a response to the query may be generated and provided back to the requesting device. As an illustrative example, if a query is related to an amount of sporting advertisement available for a particular demographic on a certain day, query director 300 may send the query to one of the rolls of devices (e.g., rolls 302, 312, 322) that includes devices storing information relating to sports advertisements. One of the devices within that roll of devices may analyze the query, determine a response based on the information stored within that device's memory, and then may output the response to the requesting device.

Additionally, one or more devices of each of rolls 302, 312, and/or 322 may be cloud-based devices and/or local devices. In other words, one or more physical devices, loaded with corresponding information, may be stored in a single location. Alternatively or additionally, one or more devices of rolls 302, 312, and/or 322 may be stored in a cloud-based system, accessible via network(s) 220, for example. In the latter scenario, for example, the devices may be loaded within their respective information using an interface, such as a terminal or other input system, and may be controlled by a user remotely across network(s) 220.

Figure 4A:
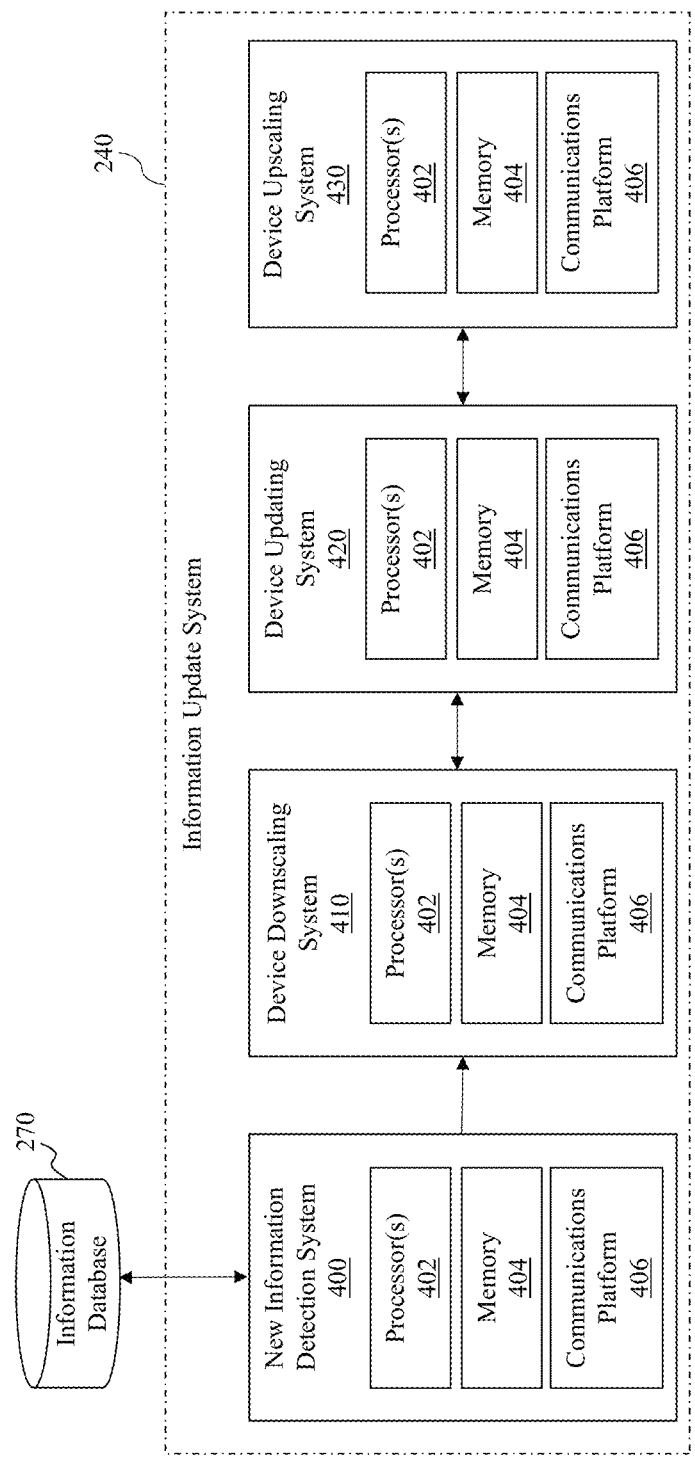
FIG. 4A is an illustrative diagram of an exemplary information update system, in accordance with various embodiments of the present teaching.

FIG. 4A is an illustrative diagram of an exemplary information update system, in accordance with various embodiments of the present teaching. As seen in FIG. 4A, information update system 240 may include a new information detection system 400, a device downscaling system 410, a device updating system 420, and a device upscaling system 430. Each of new information detection system 400, device downscaling system 410, device updating system 420, and device upscaling system 430 may include one or more processors 402, memory 404, and a communications platform 406. Persons of ordinary skill in the art will recognize that while each of new information detection system 400, device downscaling system 410, device updating system 420, and device upscaling system 430 include similarly referenced processor(s) 402, memory 404, and communications platform 406, this does not mean that each of new information detection system 400, device downscaling system 410, device updating system 420, and device upscaling system 430 share a same set of processor(s) 402, memory 404, and communications platform 406. For instance, processor(s) 402 of new information detection system 400 may differ from processor(s) 402 of device updating system 420, and the referencing of each as processor(s) 402 is merely for illustrative purposes. However, in some embodiments, resources (e.g., processing resources, storage resources, communications resources) may be shared amongst one or more of new information detection system 400, device downscaling system 410, device updating system 420, and device upscaling system 430.

Processor(s) 402 may include any suitable processing circuitry capable of controlling operations and functionality of one or more components/modules of information update system 240. Processor(s) 402 may also facilitate communications between various components within new information detection system 400, device downscaling system 410, device updating system 420, and device upscaling system 430, as well as, or alternatively, with one or more other systems/components of information update system 240. In some embodiments, processor(s) 402 may include one or more of a central processing unit ("CPU"), a graphic processing unit ("GPU"), one or more microprocessors, a digital signal processor, or any other type of processor, or any combination thereof. In some embodiments, the functionality of processor(s) 402 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processor 402 may include its own local memory, which may store program systems, program data, and/or one or more operating systems. However, processor(s) 402 may run an operating system ("OS") for one or more components of information update system 240, and/or one or more firmware applications, media applications, and/or applications resident thereon. In some embodiments, processor(s) 402 may run a local client script for reading and rendering content received from one or more websites or external content sources. For example, processor(s) 402 may run a local JavaScript client for rendering HTML or XHTML content.

Memory 404 of information update system 240 may include one or more types of storage mediums such as any volatile or non-volatile memory, or any removable or non-removable memory implemented in any suitable manner to store data for information update system 240. For example, information may be stored using computer-readable instructions, data structures, and/or program systems. As described herein, the terms "storage" and "memory" may be used somewhat interchangeably to correspond to physical components and/or networked components capable of storing data thereon. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 404 may be implemented as computer-readable storage media ("CRSM"), which may be any available physical media accessible by processor(s) 402 to execute one or more instructions stored within memory 404. In some embodiments, one or more applications may be stored within memory 404. Processor(s) 402 may be configured to execute one or more instructions associated with those applications, where the one or more instructions are operable to be stored within memory 404 (either persistently or temporarily).

Communications platform 406 may include any communications platform and/or circuitry allowing or enabling one or more components of information update system 240 to communicate with one another, and/or with one or more additional devices, servers, databases (e.g., information database 270), and/or systems. For example, communications platform 406 may facilitate communications between two or more components of information update system 240. In some embodiments, communications between one or more components of information update system 240 may be communicated using user device(s) 210 across network(s) 220 via communications platform 406. For example, network(s) 220 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of information update system 240 and/or to/from information update system 240, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications platform 406 may use any communications protocol, such as any of the previously mentioned exemplary communications protocols. In some embodiments, one or more components of information update system 240 may include one or more antennas to facilitate wireless communications with a network using various wireless technologies (e.g., Wi-Fi, Bluetooth, radiofrequency, etc.). In yet another embodiment, one or more components of information update system 240 may include one or more universal serial bus ("USB") ports, one or more Ethernet or broadband ports, and/or any other type of hardwire access port so that the communications platform facilitates communications with one or more communications networks (e.g., network(s) 220).

New information detection system 400, in one embodiment, may be configured to determine when information database 270 includes new data capable of being loaded into one or more devices (e.g., devices 304, 306, 308) of one or more rolls of devices (e.g., rolls 302, 312, 322). New information detection system 400 may, in response to one or more criteria being satisfied (e.g., a predefined amount of time elapsing) access information database 270 to determine whether new data is available. The new data may correspond to data to be loaded onto one or more devices (e.g., devices 304-328). In some embodiments, the new data may correspond to a new version of information already stored on one or more devices.

In response to determining that new data is available, and further that the new data is to be loaded to one or more host devices (e.g., devices 304-328), new information detection system 400 may retrieve that data from information database 270. The retrieved new data may, for instance, be stored in memory 404 of new information detection system 400 prior to being loaded onto a corresponding device. In some embodiments, however, new information detection system 400 may alternatively identify a location within information database 270 (e.g., a computer address, directory, file path, etc.), and may store data representing the location of the new information. Upon identifying that the new data is available, and obtaining the data (e.g., data stored memory 404 of new information detection system 400, a location of the new data within information database 270), new information detection system 400 may generate an instruction, or instructions, to begin the updating process for the various host devices of content provider(s) 230. New information detection system 400 may then provide the instruction(s) to device downscaling system 410.

Device downscaling system 410, in one embodiment, may be configured to downscale one or more host devices. As described herein, "downscaling" a device may correspond to one or more actions that prevent that device from receiving and/or responding to queries. For instance, prior to being downscaled, a device may receive a query from query directory 300, and based on the information stored within that device's memory, may generate and output a response to that query. Once downscaled, that device may either not receive the query (e.g., query director 300 may direct the query to another device), and/or be prevented from generating a response and outputting the response. In some embodiments, device downscaling system 410 may begin to downscale a device, or devices, in response to receiving an instruction from new information detection system 400, as described above. In further embodiments, device downscaling system 410 may cause one or more devices to be downscaled in response to an instruction to downscale one or more devices received from device updating system 420 and/or device upscaling system 430, as described in greater detail below.

Device updating system 420, in response to determining and/or receiving notification of one or more devices being downscaled, may begin a process of updating those devices (if more than one, otherwise updating just the one device). The process by which the updating occurs may depend on which devices are to be updated. In some embodiments, the process by which the updating occurs may take on a particular scheme so as to facilitate expedient updating, while also minimizing, if not eliminating, the need for additional computing resources (e.g., extra devices 142, 144 of FIG. 1B).

In some embodiments, device updating system 420 may be configured to downscale a first device from a first roll of devices, and then update that device. After determining that the update has been successful, the device may be upscaled (e.g., using device upscaling system 430), at which time another device from a different roll of devices may be downscaled, updated, and tested. This process may repeat until one device from each roll of devices is updated and upscaled with its corresponding new version of information. Furthermore, in response to each roll having one device (or at least one device) updated with that device's corresponding new version of information, device updating system 420 may facilitate parallel updating of one or more devices from each roll of devices. For instance, one device from each roll of devices that has not yet been updated may be downscaled, and may be loaded with a new version of information associated with that particular device's roll. This portion of the update process may, in some embodiments, be performed in parallel such that each device from the rolls of devices are updated at a substantially same time. The devices may then be upscaled, and the parallel updating process may be continued for any and all remaining devices in the rolls of devices.

In some embodiments, device updating system 420 may be further configured to perform one or more tests to a new version of information loaded onto a device prior to that device being upscaled. The one or more tests may ensure that the new version of information allows that device to be operational and able to respond to queries. If, however, the one or more tests indicate that the device that was updated is unable to handle queries, then device updating system 420 may cause the new version of information to be unloaded from that device. The prior version of information (e.g., the version of the information that previously was loaded onto the device before being updated) may then be loaded back onto the device, at which point the device may be upscaled, and the updating process may stop, or otherwise be paused until the new version of information is fixed and/or revised/ updated again.

Device upscaling system 430 may be configured, in some embodiments, to upscale one or more devices to one or more rolls of devices. As described herein, "upscaling" a device may correspond to allowing that device to receive queries and/or generate and respond to those queries. Device upscaling system 430 may upscale devices in response to device updating system 420 updating those devices with new versions of information and/or in response to those devices being reloaded with a previous version of information (if the new version of information does not pass one or more tests).

Figure 4B:
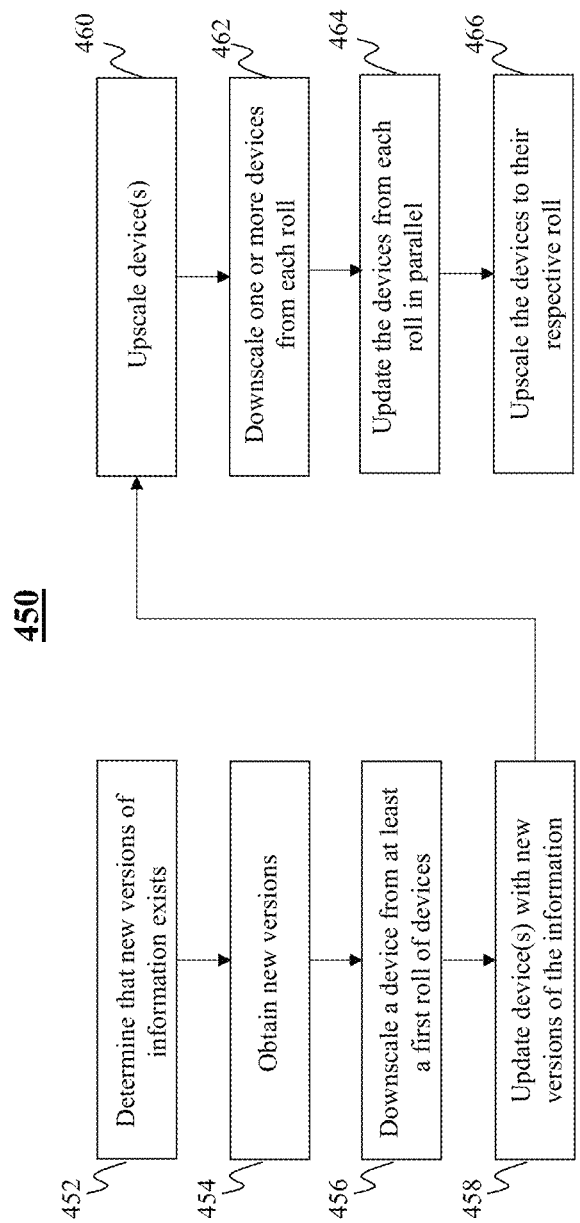
FIG. 4B is an illustrative flowchart of an exemplary process for updating host devices, in accordance with various embodiments of the present teaching.

FIG. 4B is an illustrative flowchart of an exemplary process for updating host devices, in accordance with various embodiments of the present teaching. Process 450 may, in a non-limiting embodiment, begin at step 452. At step 452, a determination may be made that a new version, or new versions, of information exist. For instance, new information detection system 400 may be configured to access information database 270 to determine whether new versions of information for one or more rolls of devices (e.g., rolls of devices 302, 312, 322) is/are available. New information detection system 400 may access information database 270 responsive to one or more conditions being satisfied, in one embodiment, such as a predefined amount of time elapsing. If no new versions of information are available, then new information detection system 400 may wait until one or more conditions are again satisfied (or if different conditions, then those conditions being satisfied), and then may check whether information database 270 includes new versions of information.

At step 454, the new versions of information may be obtained. For instance, if new information detection system 400 determines, at step 452, that new versions of information are available, then those new versions of information may be obtained by new information detection system 400. In some embodiments, the new versions of information may be downloaded to memory 404 of new information detection system 400. In other embodiments, however, one or more addressable locations (e.g., a URL) for where the new versions of information may be accessed within information database 270 may be obtained by new information detection system 400.

At step 456, a device from at least a first roll of devices may be downscaled. In one embodiment, device downscaling system 410 may cause a first device from a first roll of devices to be downscaled. For example, device 304 from first roll of devices 302 may be downscaled by device downscaling system 410. In another embodiment, a device from two or more rolls of devices may be downscaled at a substantially same time. For instance, device 304 from first roll of devices 302, device 314 from second roll of devices 312, and device 324 from M-th roll of devices 322 may each be downscaled at a substantially same time. As described in greater detail below, whether a single device from a single roll of devices is downscaled or a single device from multiple rolls of devices are downscaled may depend on an ability of information update system 240 to perform the one or more tests for new versions of information in order to ensure that the one (or more) devices are operational upon being updated.

At step 458, the one or more devices may be updated with the new version(s) of the information. For instance, device updating system 420 may facilitate the updating of a device with a new version of the information for that device's corresponding roll of devices. As an illustrative example, if device 304 of first roll of devices 302 is downscaled, then device updating system 420 may update device 304 with a new version of the first information (e.g., load the new version into the memory of device 304). As another example, if device 304 of first roll 302, device 314 of roll 312, and device 324 of roll 322 are downscaled, then device upscaling system 420 may update devices 304, 314, and 324 with a new version of the first information, a new version of the second information, and a new version of the M-th information, respectively. Furthermore, device updating system 420 may perform one or more tests to ensure that the device is operational prior to being upscaled. If the new version of information renders the device non-operational, device updating system 420 may cause the new version of information to be removed from the device, and may further cause the previous version of information to be loaded to that device. At step 460, the one (or more) device(s) may be upscaled. For example, if device 304 of first roll of devices 302 is updated with a new version of the first information, then in response to determining that device 304 is operational (e.g., capable of handling incoming queries), device 304 may be upscaled back to first roll of devices 302. In some embodiments, device upscaling system 430 may facilitate device upscaling.

At step 462, one or more devices from each roll may be downscaled. For instance, in response to a device from each roll of devices being updated with the new version of information corresponding to that roll, device downscaling system 410 may cause at least one device from each roll to be downscaled. For example, in response to device 304 of roll 302 being updated with a new version of the first information, device 314 of roll 312 being updated with a new version of the second information, and device 314 of roll 322 being updated with a new version of the M-th information, device downscaling system 410 may downscale devices 306, 316, and 326, substantially in parallel. As each roll (e.g., rolls 302, 312, and 322) include at least one device (e.g., devices 304, 314, and 324) that have been updated and tested, information update system 240 is aware that the new versions of information are functional, and thus the remaining devices from the rolls may be updated in parallel. In some embodiments, more than one device from each roll may be downscaled at step 462. For instance, devices 306 and 306 of roll 302, devices 316 and 318 of roll 312, and devices 326 and 328 of roll 322 may be downscaled at a substantially same time, however this is merely exemplary.

At step 464, each device from the various rolls may be updated in parallel. For instance, device updating system 420 may update the devices with their corresponding new versions of information at a substantially same time. In other words, each device may be updated such that at least one additional device from each roll (e.g., in addition to the first device from each roll being updated at step 458) is updated with the new information and available to be upscaled at a substantially same time. At step 466, the devices may be upscaled to their respective rolls. If additional devices from the rolls still need to be updated (e.g., they include the previous information), then process 450 may repeat steps 462-466 for those devices.

By performing the updating process as described above, significant reductions in both time and computing resources are obtained. As an illustrative example, using the aforementioned technique for system 100 of FIG. 1A, all of the devices may be updated in a time of 2X-3X without any additional devices being used. For instance, if devices 104 and 114 are downscaled and updated with new version of the first and second information, respectively, at a same time, then the total time to update system 100—with a time to update one device being referred to as "X," would be 2X. If alternatively, devices 104 and 114 are downscaled and updated serially, then the time to update system 100 would be 3X (e.g., 1X to update device 104, 1X to update device 114, and 1X to update devices 106 and 116 in parallel). In some embodiments, the only constrain may correspond to an amount of testing resources available to determine whether the new versions of information are available. If there are enough resources to validate one device from each roll in parallel, then this will reduce the amount of time needed. However, if only a single testing resource is available, then the first devices from each roll are downscaled, updated, and tested serially. The latter technique, while slower than the previously mentioned technique, is still faster than the rolling install process, and furthermore does not require the extra computing resources required for a blue/green install.

Figure 5A:
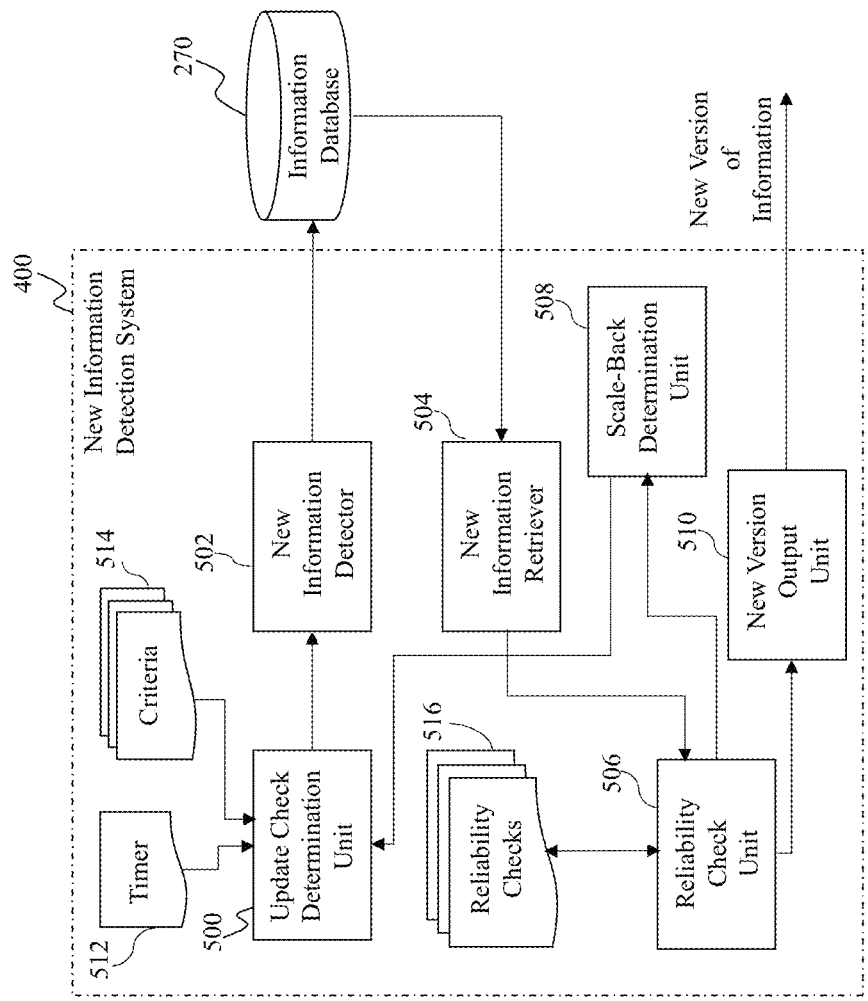
FIG. 5A is an illustrative diagram of an exemplary new information detection system, in accordance with various embodiments of the present teaching.

FIG. 5A is an illustrative diagram of an exemplary new information detection system, in accordance with various embodiments of the present teaching. New information detection system 400, in the illustrative embodiment, may include an update check determination unit 500, a new information detector 502, a new information retriever 504, a reliability check unit 506, a scale-back determination unit 508, and a new version output unit 510. Each of update check determination unit 500, new information detector 502, new information retriever 504, reliability check unit 506, scale-back determination unit 508, and new version output unit 510 may be implemented based on one or more computer programs (e.g., instructions) stored within memory 404 of new information detection system 400. The particular functions of each of update check determination unit 500, new information detector 502, new information retriever 504, reliability check unit 506, scale-back determination unit 508, and new version output unit 510 may be realized upon execution of the one or more computer programs by processor(s) 402 of new information detection system 400.

Update check determination unit 500 may be configured, in one embodiment, to determine whether to check information database 270 for new versions of information. Each new version of information may be generated at a substantially same time. Further, each roll of devices may include a subset of a particular information set. As an illustrative example, forecasting may be performed using historical data (e.g., a past 7 days of data), such that each roll of devices may be assigned a portion of the historical data (e.g., one of the 7 days). In some embodiments, update check determination unit 500 may employ a timer 512 and/or criteria 514 for determining whether a check is to be performed. For instance, timer 512 may indicate to update check determination unit 500 when a predetermined amount of time has elapsed from a last check of information database 270. In response to timer 512 indicating that the predetermined amount of time has elapsed, update check determination unit 500 may send an instruction to new information detector 502 to check for new versions of information stored within information database 270. In some embodiments, timer 512 may be configurable such that the predetermined amount of time is adjusted based on certain parameters of information update system 240 (e.g., during holiday seasons, during known volatile time periods, etc.). Criteria 514 may correspond to any suitable criteria and/or condition by which, upon being met, causes update check determination system 500 to generate the instruction for new information detector 502 to check for new versions of information stored within information database 270. For example, criteria 514 may correspond to one or more host devices (e.g., devices 304-328) being added to a roll of devices (e.g., rolls 302, 312, 322), an input from another device/system/user, an event (e.g., a new year, a holiday), an indication that there have been updates to libraries or other code running on the host devices, an indication that a new feature is available, or any other suitable condition, or any combination thereof. In one embodiment, information detector 502 may check for new versions during deployment in order to dynamically select devices in a distributed system. In this particular example, an exact host that will be updated may not be known prior to deployment.

Upon receipt of an instruction to check for new information, new information detector 502 may access information database 270. Upon accessing information database 270, the various data associated with each roll may be identified, and a determination may be made as to whether a new version of that data is available. Information database 270 may be configured such that, for each roll of devices, a data structure indicates a current version of data stored by the devices of that roll, as well as whether a new version of that data is available. In some embodiments, the data structure may include a column with a new version flag. If the new version flag indicates a new version of that data is available, then that column may include a logical 1 (e.g., TRUE) value, whereas if no new version of data is available, then that column may include a logical 0 (e.g., FALSE) value. Furthermore, the data structure may store metadata including timestamps of when the new data was generated.

New information detector 502 may access information database 270 with data representing the different rolls of devices (e.g., rolls 302, 312, 322) of the corresponding content provider(s) 230 that updates are to be checked for. Upon accessing information database 270, new information detector 502 may query the data structure of information database 270. The data structure, in some embodiments, may include a row for each roll of devices. Therefore, if the new version flag column for the particular row associated with each roll of devices indicates that a new version of the data for that roll is available, then new information retriever 504 may retrieve that new data (e.g., new version of the information for that roll). In some embodiments, new information retriever 504 may only retrieve the new data if the new version flag column for each roll's corresponding row includes a logical 1 value indicating that a new version of that roll's information is available.

In some embodiments, new information retriever 504 may be configured to retrieve the data representing the new versions of information for each roll of devices from information database 270. In this particular scenario, the data may be downloaded to memory 404 of new information detection system 400 via communications platform 406. Alternatively, in some embodiments, an address of where the data representing the new versions of information are stored within information database 270 may be obtained. For example, the data structure, as mentioned above, may further include an address column indicating a location address (e.g., a URL, file path, directory information, etc.) for where the data is located. For example, a new version of the first information may be located at a first URL, a new version of the second information may be located at a second URL, and a new version of the M-th information may be located at a third URL. Therefore, in this particular scenario, new information retriever 504 may obtain the first, second, and third URLs. The data or the URLs, depending on what is obtained by new information retriever 504, may in turn be provided to reliability check unit 506.

Reliability check unit 506 may be configured, in some embodiments, to perform one or more reliability checks to the data retrieved/identified from new information retriever 504. For instance, if the data representing the new version of the information for each roll of devices has been downloaded to memory 404 of new information detection system 400, then reliability check unit 506 may perform one or more of reliability checks 516 to the downloaded data. However, if the data is accessed via a link or other pointer to a location within information database 270 (or similarly another device/database/system), then reliability check unit 506 may access the data and perform reliability checks 516 to the data. Reliability checks 516 may function to generally determine whether the data is within certain general parameters. For instance, if the data is associated with a number of advertisement impressions available, reliability checks 516 may check to see whether the data indicates valid advertisement impression information. As an illustrative example, one reliability check 516 may serve to confirm that a number of impressions available globally is larger than a number of impressions available in the United States of America.

If reliability check unit 506 determines, based on reliability checks 516, that the data representing the new version of the information does not pass, then reliability check unit 506 may invoke scale-back determination unit 508. Scale-back determination unit 508 may generate an instruction indicating that the new version of information for one or more of the rolls of devices is invalid, and that the new version of information should not be employed for device updates. The instruction may then be sent to update check unit 500, which may reset timer 512 and/or criteria 514, and thus wait until it is determined that another update check is to be made.

If, however, reliability check unit 506 determines, based on reliability checks 516, that the data representing the new version of the information does pass reliability checks 516, then reliability check unit 506 may invoke new version output unit 510. New version output unit 510 may be configured to output the new version of information to device downscaling system 410 to commence the updating process. In some embodiments, by outputting the new version of information, the data representing the new version of information for one or more of the rolls of devices is output from new information detection system 400. In other embodiments, outputting the new version of information corresponds to outputting a URL or other data indicating a location of the new version(s) of information, and thus prompting device downscaling system 410 to begin the device updating process (e.g., downscaling a device from a roll of devices).

Figure 5B:
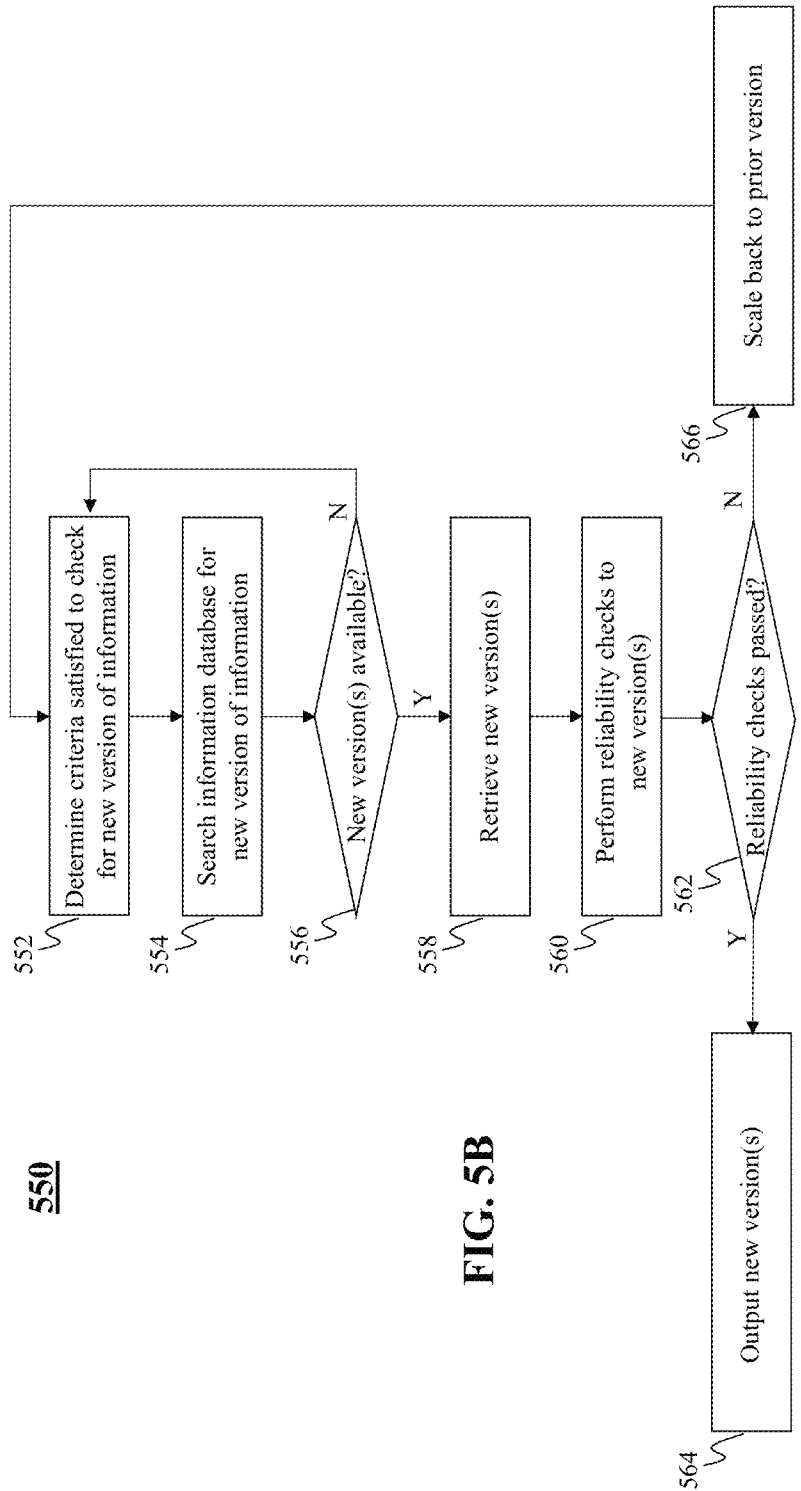
FIG. 5B is an illustrative flowchart of an exemplary process for identifying a new version of information for deployment to host devices, in accordance with various embodiments of the present teaching.

FIG. 5B is an illustrative flowchart of an exemplary process for identifying a new version of information for deployment to host devices, in accordance with various embodiments of the present teaching. Process 550, in a non-limiting embodiment, may begin at step 552. At step 552, it may be determined that one or more criteria are satisfied to check for new versions of information. For instance, update check determination unit 500 may determine where criteria 514 has been satisfied, and/or timer 512 indicates that a predetermined amount of time has elapsed. If update check determination unit 500 does not indicate that criteria 514 have been satisfied and/or timer 512 indicates that the predetermined amount of time has elapsed, then update check determination unit 500 may continue monitoring until criteria 514 have been satisfied and/or timer 512 indicates that the predetermined amount of time has elapsed. If, however, update check determination unit 500 determines that criteria 514 have been satisfied and/or timer 512 indicates that the predetermined amount of time has elapsed, then process 550 may proceed to step 554.

At step 554, information database 270 may be searched for new versions of information. For instance, new information detector 502 may search information database 270 for new versions of information corresponding to each roll of devices. At step 556, a determination may be made as to whether one or more new versions of information corresponding to each roll of devices is/are available within information database 270. For instance, new information detector 502 may determine whether a new version flag column for each roll's corresponding row within a data structure of information database 270 indicates that a new version of the information for that roll of devices is available.

If, at step 556, it is determined that the new version(s) of information is/are available, then process 550 may proceed to step 558. At step 558, the new version(s) of information may be retrieved. For instance, new information retriever 504 may retrieve data representing the new version or versions of information associated with the corresponding rolls of devices. As mentioned before, the retrieved data may be downloaded to memory 404 of new information detection system 400, or a URL/pointer indicating a location of the data representing the new version of the information may be retrieved by new information retriever 504. If, however, at step 556, it is determined that the new version(s) of information is/are not available, then process 550 may return to step 552.

At step 560, one or more reliability checks may be performed to the new version(s) of information. For instance, reliability check unit 506 may perform one or more reliability checks 516 to the data representing the new version(s) of the information. At step 562, a determination may be made as to whether the reliability checks have been passed. If, at step 562, it is determined that the reliability checks have been passed, then process 550 may proceed to step 564. At step 564, the new version of the information may be output. For instance, new version output unit 510 may output the data representing the new version(s) of the information, or new version output unit 510 may output the URL/pointer to the location of the data. If, however, at step 562, it is determined that one or more of the reliability checks have not passed, then process 550 may proceed to step 566. At step 566, a determination may be made to scale back to a prior version of the information for the corresponding rolls of devices. For instance, scale-back determination unit 508 may generate and send an instruction to update check determination unit 500 to prevent the new version of information from being loaded onto the devices (e.g., devices 302-328), and further to check/continue to check for new updates to the information.

Figure 6A:
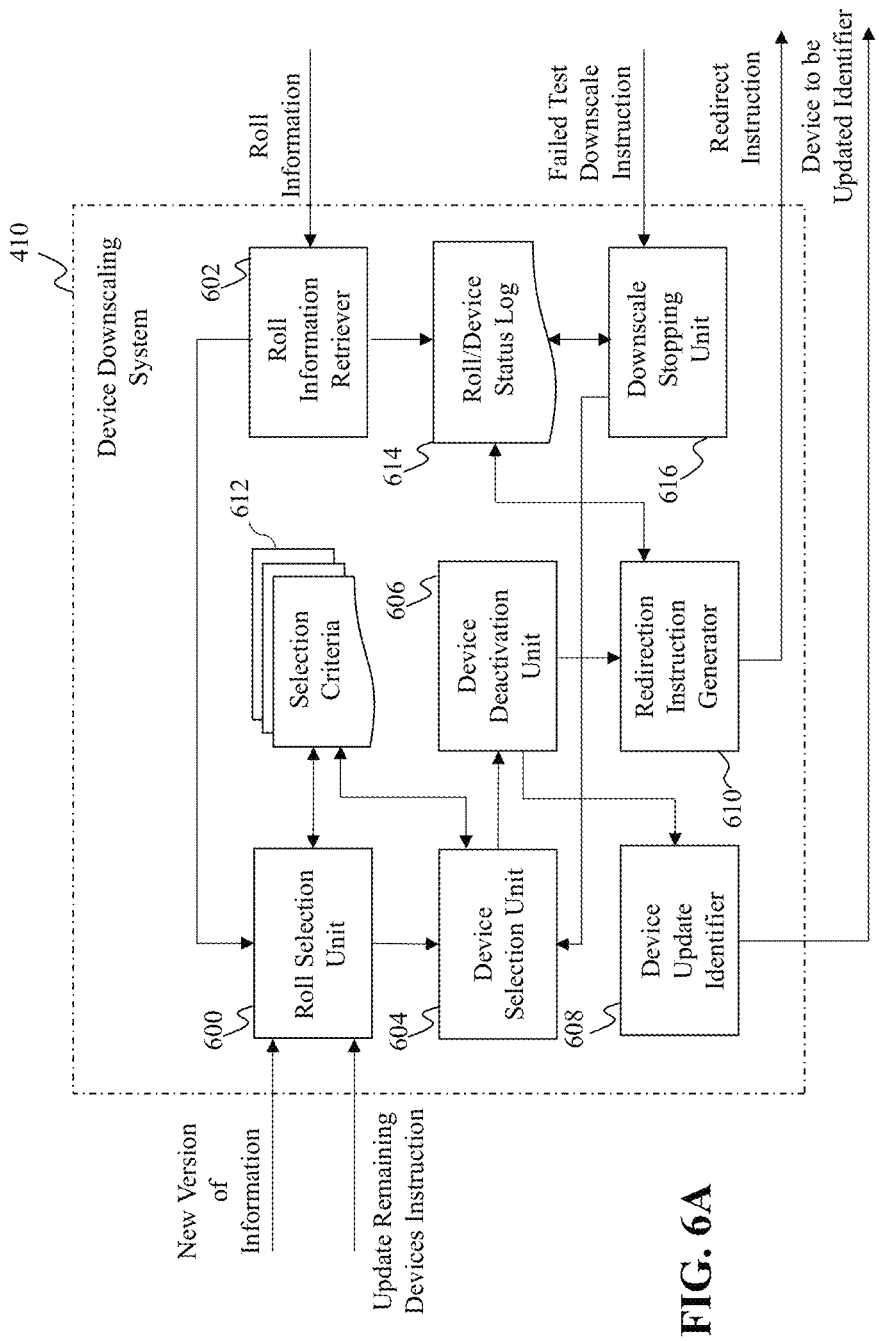
FIG. 6A is an illustrative diagram of a device downscaling system, in accordance with various embodiments of the present teaching.

FIG. 6A is an illustrative diagram of a device downscaling system, in accordance with various embodiments of the present teaching. In the illustrative embodiment, device downscaling system 410 may include, amongst other aspects, a roll selection unit 600, a roll information retriever 602, a device selection unit 604, a device deactivation unit 606, a device update identifier 608, a redirection instruction generator 610, and a downscale stopping unit 616. Each of roll selection unit 600, roll information retriever 602, device selection unit 604, device deactivation unit 606, device update identifier 608, redirection instruction generator 610, and downscale stopping unit 616 may be implemented based on one or more computer programs (e.g., instructions) stored within memory 404 of device downscaling system 410. The particular functions of each of roll selection unit 600, roll information retriever 602, device selection unit 604, device deactivation unit 606, device update identifier 608, redirection instruction generator 610, and downscale stopping unit 616 may be realized upon execution of the one or more computer programs by processor(s) 402 of device downscaling system 410.

Roll selection unit 600, in one embodiment, may be configured to select a roll of devices with which to begin the process of updating. Roll selection unit 600 may, for example, select one of rolls 302, 312, and 322 for updating. In some embodiments, roll selection unit 600 may receive the new version of information from new information detection system 400, which may cause roll selection unit 600 to select a roll. Roll selection unit 600 may employ selection criteria 612 to determine which roll is to be selected. Selection criteria 612 may indicate the roll to be used based, in one embodiment, and at least in part, on the new version of information, however this is exemplary. As an illustrative example, roll selection unit 600 may select first roll 302 as the roll of devices with which to begin the updating process. In some embodiments, a first device from each roll may be downscaled at a substantially same time. In this particular scenario, in response to receiving the new version of information, roll selection unit 600 may select each roll based on roll information received by roll information retriever 602, and may select one device from each roll using device selection unit 604, as described below.

In some embodiments, roll selection unit 600 may further receive an update remaining devices instruction. As described in greater detail below, in response to updating at least a first device from a first roll of devices, the remaining devices of the remaining rolls of devices may also need to be updated. The update remaining devices instruction may then facilitate the process of downscaling additional devices for updates. In some embodiments, the devices to be updated in response to receiving the update remaining devices instruction may correspond to a device from each of the remaining rolls. For example, if device 304 from first roll 302 has been updated, the update remaining devices instruction may prompt device 314 from second roll 312 to begin the process of being updated (e.g., selecting second roll 312 based on roll information, and then selecting device 314 from roll 312 to be deactivated). As another example, if one device from each roll of devices has been updated, then another instance of the update remaining devices instruction may be received, which may prompt roll selection unit 600 to select each roll, based on the roll information indicating that one device from each roll has already been updated, and thus prompting device selection unit 604 to select a device from each roll to be downscaled in parallel.

In some embodiments, roll selection unit 600 may obtain roll information from roll information retriever 602. The roll information may indicate a current status of each device within each of the rolls. For example, roll information retriever 602 may receive roll information for first roll 302 indicating that devices 304-308 each include the first information. Upon receipt of the roll information from roll information retriever 602, roll selection unit 600 may select a roll to begin the updating process, and may provide a notification of the roll that has been selected to device selection unit 604. In some embodiments, the roll information may be provided by roll information retriever 602 to roll/device status log 614, which may log the present information associated with each roll (e.g., the information stored by each device within a particular roll).

Device selection unit 604 may be configured to select a device from the selected roll of devices with which to begin the updating process. In some embodiments, selection criteria 612 may further be employed by device selection unit 604 to select which device from a particular roll of devices. For example, if the roll of devices selected by roll selection unit 600 corresponds to first roll of devices 302, then device selection unit 604 may select first device 304 as the device to begin the updating process. Information indicating the selected device may then be provided to device deactivation unit 606.

Device deactivation unit 606 may be configured to deactivate a device based on the information received from device selection unit 604. As described herein, a device may be downscaled by being deactivated from service. When deactivated, a device may be prevent from receiving and/or responding to queries. In some embodiments, the device may be deactivated by remove that device from a listing of available devices that query director 300 of FIG. 3 may use to direct traffic (e.g., incoming queries). By deactivating, and thus "downscaling," a device, that device may be updated without having any queries being received, thus minimizing the risk of that device providing incorrect response information.

Upon deactivating the corresponding device, device deactivation unit 606 may provide a notification to device update identifier 608 indicating which device has been deactivated. Device update identifier 608 may, in turn, generate an identifier indicating the device that is to be updated with the new version of information for the corresponding roll of information. As previously mentioned, the new version of information (e.g., data representing the new version of information, a URL/pointer to the data, etc.) may be received by roll selection unit 600. This information may be further propagated by device downscaling system 410 to device update identifier 608 such that the identifier of the device to be updated further indicates the data to be used by device updating system 420 for performing the update to that device.

Device deactivation unit 606 may further provide a notification to redirection instruction generator 610 indicating the device that has been deactivated. Redirection instruction generator 610, in one embodiment, may be configured to cause any query that may otherwise be directed to the selected device that has been deactivated, to instead by directed to a different host device within the same roll of devices. Redirection instruction generator 610, in one embodiment, may generate a redirect instruction, which may be output by device downscaling system 410. The redirect instruction may be sent to query director 300, for example, and may update a listing of devices that query director 300 may have for forwarding queries. The redirect instruction may cause query director 300 to place the deactivated device on a restricted list of devices such that any query that would have been sent to that device is instead, sent to another device from the same roll of devices. For example, if device 304 is deactivated, then query director 300 may remove device 304 from its listing of devices capable of handling queries, and may forward any query that could be serviced by device 304 to one of devices 306 and 308, or any other device of roll 302. Furthermore, in some embodiments, redirection instruction generator 610 may update a roll/device status log 614 based on the redirect instruction that has been generated. Roll/device status log 614 may log each device included by content providers 230 of FIG. 3, as well as that device's corresponding roll information and that device's activity status. Thus, when a device is downscaled, an indication that the device has been downscaled may be logged within roll/device status log 614, along with an indication of the roll with which that device belongs.

In some embodiments, as described in greater detail below, downscale stopping unit 616 may be employed to stop a downscaling process from proceeding. For instance, downscale stopping unit 616 may receive a failed test downscale instruction from device updating system 420, as describe below, indicating that one or more instances of data representing a new version of information for a roll of devices has failed one or more performance tests. In this particular scenario, downscale stopping unit 616 may receive the failed test downscale instruction, and may facilitate the downscaling process from proceeding any further (e.g., downscaling any other devices). In some embodiments, downscale stopping unit 616 may provide a notification to device selection unit 604, which may be employed to prevent any subsequent devices from being selected for deactivation.

Figure 6B:
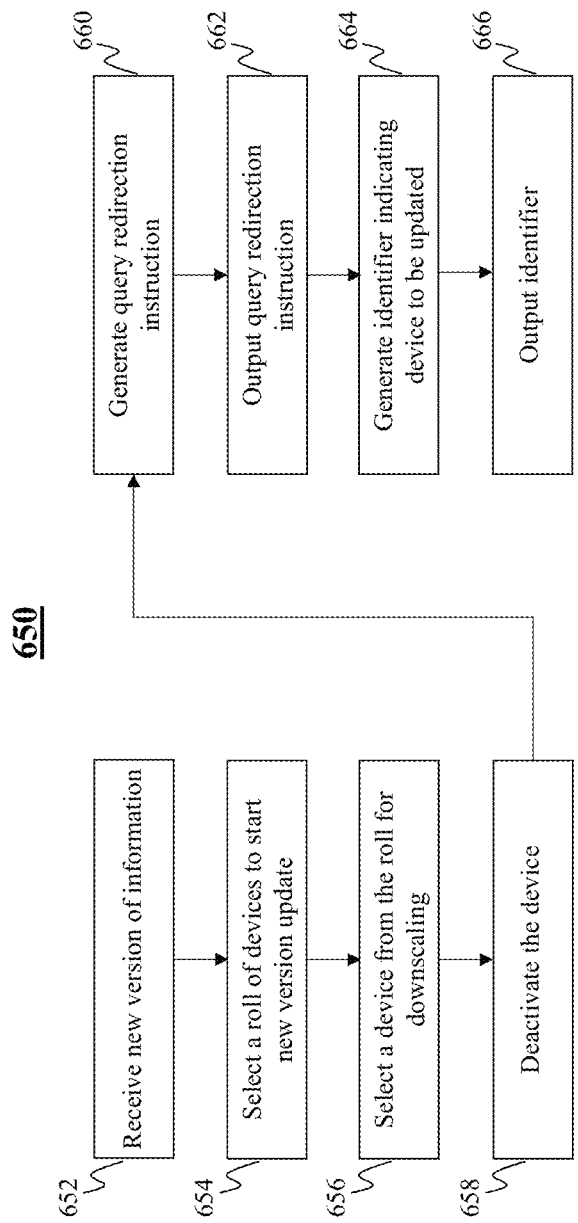
FIG. 6B is an illustrative flowchart of an exemplary process for downscaling one or more devices, in accordance with various embodiments of the present teaching.

FIG. 6B is an illustrative flowchart of an exemplary process for downscaling one or more devices, in accordance with various embodiments of the present teaching. Process 650, in a non-limiting embodiment, may begin at step 652. At step 652, a new version, or new versions, of information may be received. For example, roll selection unit 600 may receive a new version of information for a roll of device (e.g., roll 302). As another example, roll selection unit 600 may location information (e.g., a URL) indicating a location of data representing the new version(s) of information.

At step 654, a roll of devices may be selected to start a process of updating to the new version of information for that roll. For example, roll selection unit 600 may select a roll to start the updating process based on roll information retrieved by roll information retriever 602. As another example, roll selection unit 600 may select multiple rolls for the updating process to begin with. At step 656, a device may be selected from the roll that was selected for downscaling. For instance, device selection unit 604 may select one device from the selected roll if a single roll is selected, or may select one device from each of the rolls if multiple rolls are selected. At step 658, the selected device may be deactivated. In some embodiments, device deactivation unit 606 may deactivate the selected device(s). By deactivating a device, that device may no longer receive and/or respond to incoming queries.

At step 660, a query redirection instruction may be generated. At step 62, the query redirection instruction may be output. For instance, redirection instruction generator 610 may generate the redirection instruction and output the redirection instruction to query director 300. The redirection instruction may cause query director 300, in one embodiment, to reroute any query that would be directed to the selected device(s) to instead by directed to another device from that same device's roll. At step 664, an identifier indicating the selected and deactivated device(s) to be updated may be generated. At step 666, the identifier may be output. For instance, device update identifier 608 may generate the identifier and may output the identifier to device updating system 420 in order to begin the process of updating the selected device(s).

Figure 7A:
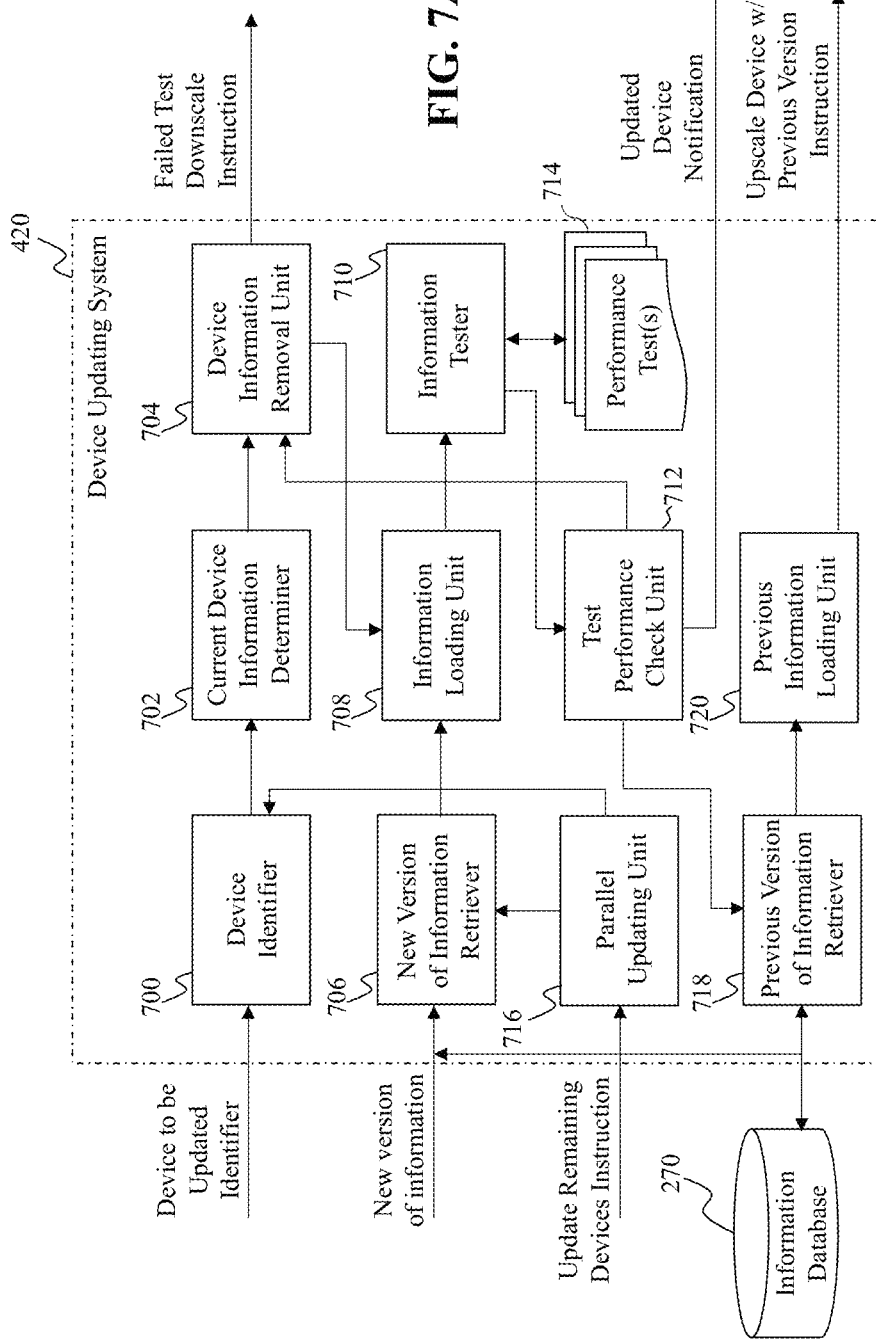
FIG. 7A is an illustrative diagram of an exemplary device updating system, in accordance with various embodiments of the present teaching.

FIG. 7A is an illustrative diagram of an exemplary device updating system, in accordance with various embodiments of the present teaching. Device updating system 420, in the illustrative embodiment, may include, amongst other aspects, a device identifier 700, a current device information determiner 702, a device information removal unit 704, a new version of information retriever 706, an information loading unit 708, an information tester 710, a test performance check unit 712, a parallel updating unit 716, a previous version of information retriever 718, and a previous information loading unit 720. Each of device identifier 700, current device information determiner 702, device information removal unit 704, new version of information retriever 706, information loading unit 708, information tester 710, test performance check unit 712, parallel updating unit 716, previous version of information retriever 718, and previous information loading unit 720 may be implemented based on one or more computer programs (e.g., instructions) stored within memory 404 of device updating system 420. The particular functions of each of device identifier 700, current device information determiner 702, device information removal unit 704, new version of information retriever 706, information loading unit 708, information tester 710, test performance check unit 712, parallel updating unit 716, previous version of information retriever 718, and previous information loading unit 720 may be realized upon execution of the one or more computer programs by processor(s) 402 of device updating system 420.

Device identifier 700 may be configured to the device to be updated identifier from device downscaling system 410, which may indicate which device, or devices, are to be updated. For instance, if a single device is indicated for update by the device to be updated identifier, then device identifier 700 may recognize the location of that device within content provider(s) 230. For example, if the device to be updated is device 304, then device identifier 700 may identify an IP address of the device to be updated, a MAC address, and/or any other information suitable for identifying that device within the various devices included in the plurality of rolls of devices.

In some embodiments, as described in greater detail below, device identifier 700 may be configured to identify multiple devices for updating. For instance, in one embodiment, the device to be updated identifier may indicate multiple devices, each from a different roll (e.g., rolls 302, 312, 322), with which are to be updated with a new version of information associated with that device's roll. In yet further embodiments, device identifier 700 may identify one or more devices from each roll to be updated in parallel based on instructions received from parallel updating unit 716. Parallel updating unit 716, in one example embodiment, may be configured to receive an update remaining devices instruction from device downscaling system 410, which may indicate that at least a first device from each roll of devices has been updated with their corresponding information. In response, the update remaining devices instruction may be output and provided to parallel updating unit 716. The instructions then received from parallel updating unit 716 may therefore indicate to device identifier 700 that at least one device from each roll of devices, as indicated by the update remaining devices instruction, are to be updated in parallel. Thus, device identifier 700 may be configured to obtain or otherwise identify an IP address, MAC address, and/or any other location identifier for each of the one or more devices of each of the rolls of devices. For example, device identifier 700, in response to receiving the instructions from parallel updating unit 716, may obtain an IP address associated with device 306 of first roll 302, device 316 of second roll 312, and device 326 of M-th roll 322.

Current device information determiner 702 may, in one embodiment, be configured to determine the current information stored/loaded onto the selected device(s) to be updated. For instance, if device 302 is to be updated, current device information determiner 702 may determine that device 302 currently has first information stored thereon. Current device information determiner 702 may then provide an indication of the selected device's current information to device information removal unit 704. Device information removal unit 704 may be configured to remove a version of information from a selected device, or devices, based on the indication that the devices are to be updated with new information. For instance, prior to being updated with a new version of the first information, device 302 may have the first information removed using device information removal unit 704. In some embodiments, removing information from a device may correspond to deleting the data representing that information from the device's memory. In other embodiments, removing information from a device may correspond to moving the corresponding data representing that information to a temporary cache that, upon successful updating of data representing the new version of information, may be purged from the device.

Information loading unit 708 may, in one embodiment, be configured to load data representing the new version of information to the selected device(s) to be updated. The new version of information, whether the data itself or a pointer/URL indicating the location where that information may be accessed from (e.g., information database 270), may be retrieved by new information retriever 706, which in turn may provide that data, pointer, and/or URL to information loading unit 708. Information loading unit 708 may, therefore, download the data to the selected device(s) memory. In some embodiments, the data may be downloaded to temporary memory, such that one or more tests may be performed by information tester 710 to determine whether the data renders the device(s) operational. The amount of time needed to load the information may be based on the size of the data that needs to be downloaded, the connection speed of communication platform 406 of device updating system 420, and/or the various features associated with the selected device(s) (e.g., available memory, communications components of the device, etc.). As mentioned previously, in some embodiments the data representing the new version of information to be loaded onto the selected device(s) may be downloaded by device downscaling system 410. In this particular scenario, the amount of time needed to load the data to the selected device(s) may be less due to the data not having to be downloaded for updating, but instead only loaded onto the device(s). However, persons of ordinary skill in the art will recognize that any suitable technique may be employed to load data onto a device, and the aforementioned are merely exemplary.

Information tester 710 may be configured, in one embodiment, to perform one or more performance tests 714 to the data that has been loaded onto the selected device(s) by information loading unit 708. Performance test(s) 714 may correspond to any suitable test that checks the functionality of the new version of information. For example, information tester 710 may execute performance test(s) 714 to ensure that the device(s), loaded with the new version of information, are capable of handling incoming queries. Test performance check unit 712 may receive the results of performance test(s) 714, as executed by information tester 710, and may either indicate that the new version of information loaded on the device(s) has/have passed or have failed.

If test performance check unit 712 determines that the newly updated device has passed performance test(s) 714, then test performance check unit 712 may output an updated device notification. The updated device notification may be provided to device upscaling system 430 to facilitate the upscaling of the validated and updated device(s). In some embodiments, test performance check unit 712 may output multiple updated device notifications in the scenario where multiple devices have been checked (and passed) by information tester 710. For example, if the first stage of updating occurs whereby one device from each of rolls (e.g., rolls 302, 312, 322) have been updated, then upon determining that performance test(s) 714 have been passed by each device, test performance check unit 712 may output one or more updated device notifications indicating that each device has passed. As another example, if one or more devices from each roll are being updated in parallel, as is the case in the second stage of updating, then responsive to determining that those devices have passed performance test(s) 714, test performance check unit 712 may output one or more updated device notifications indicating that the devices have successfully been updated, and are therefore ready to be upscaled.

If, however, one or more performance tests 714 are determined to have been failed by test performance check unit 712, then that may indicate that the new version of information renders the selected device(s) non-operational (e.g., cannot respond to incoming queries). In this particular scenario, test performance check unit 712 may, in one embodiment, instruct device information removal unit 704 to remove the data representing the new version of information from the memory of the selected device(s). Furthermore, test performance check unit 712 may also cause device information removal unit 704, either prior to, during, or after removal of the data representing the new version of information, to generate and output a failed test downscale instruction. The failed test downscale instruction may then be provided to downscale stopping unit 616 of device downscaling system 410, as mentioned above, to prevent any additional device downscaling, and thus preventing any additional devices from being loaded with data that renders that device, or those devices, non-operational.

Additionally, if test performance check unit 712 determines that a new version of information does not pass one or more performance tests 714, an instruction may be sent to previous version of information retriever 718. In response to receiving the instruction, previous version of information retriever 718 may retrieve the previous version of information loaded onto that device from information database 270. As mentioned above, information database 270 may include a data structure that stores each device's current and previous versions of information. Therefore, if the new version of information fails performance test(s) 714, previous version of information retriever 718 may access the data structure, identify the previously loaded version of information for that device, and obtain data representing the previous version of information. Upon receipt of the data representing the previous version, or identifying a location of where the previous version of information resides within information database 270 (e.g., a URL, file path, directory information, etc.), previous information loading unit 720 may load the data representing the previous version to the indicated device(s). Persons of ordinary skill in the art will recognize that, in some embodiments, data representing the previous version of information may alternatively be stored in temporary memory on the corresponding device, and therefore when test performance check unit 712 determines that performance test(s) 714 fail, the data representing the previous version of information is moved from temporary memory to persistent memory. Previous information loading unit 720 may be further configured to generate and output an upscale device with previous version instruction, which may be provided to device upscaling system 430 for upscaling the device(s) with the previous version of information.

Figure 7B:
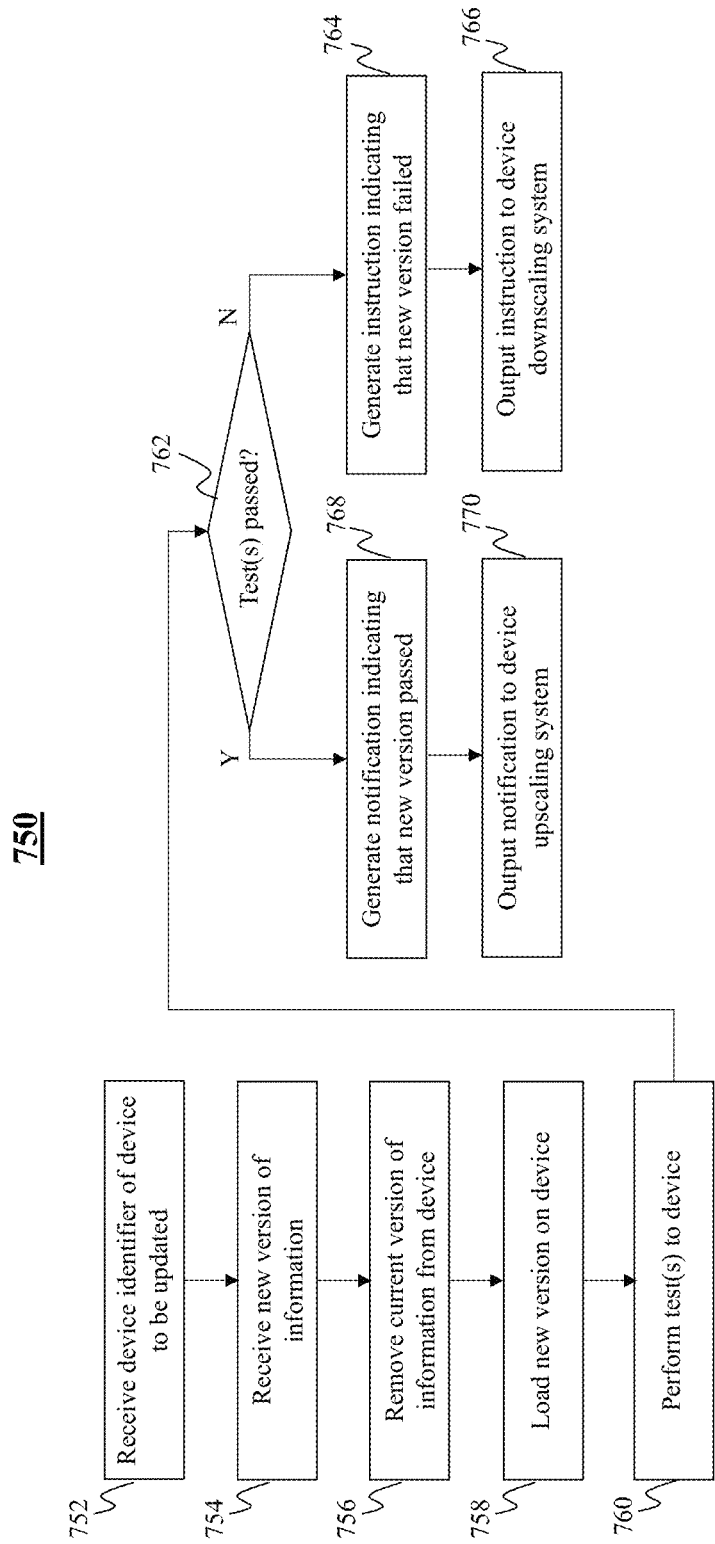
FIG. 7B is an illustrative flowchart of an exemplary process for performing device updates, in accordance with various embodiments of the present teaching.

FIG. 7B is an illustrative flowchart of an exemplary process for performing device updates, in accordance with various embodiments of the present teaching. In a non-limiting embodiment, process 750 may begin at step 752. At step 752, a device identifier of a device to be updated may be received. For instance, device identifier 700 may receive a device to be updated identifier from device downscaling system 410, indicating the device to be updated. At step 754, a new version of information may be received. For instance, new version of information retriever 706 may receive data representing the new version of information, or a pointer/URL directed to a location of the data representing the new version of information (e.g., within information database 270). At step 756, a current version of the information may be removed from the device. For instance, device information removal unit 704 may remove the data representing the current version of information from the memory of the identified device to be updated.

At step 758, the data representing the new version of information may be loaded onto the device. For instance, the data representing the new version of the information may be loaded onto the identified device using information loading unit 708. As an illustrative example, information loading unit 708 may load data representing a new version of the first information onto device 304 of first roll 302. At step 760, one or more tests may be performed to the device. For instance, information tester 710 may perform one or more performance tests 714 to the device upon the data representing the new version of information being loaded thereon. At step 762, a determination may be made as to whether the test(s) have been passed. For instance, test performance check unit 712 may determine whether performance test(s) 714 have been passed.

If, at step 762, it is determined that the test(s) had/have been passed, then process 750 may proceed to step 768. At step 768, a notification indicating that the new version of information has passed the performance test(s) may be generated, and at step 770, the notification may be output to device upscaling system 430. If, however, at step 762, it is determined that one or more of the tests have not been passed, then process 750 may proceed to step 764. At step 764, an instruction indicating that the new version of information has failed may be generated, and at step 766, the instruction may be output to device downscaling system 766. For instance, device information removal unit 704 may output a failed test downscale instruction to device downscaling system 410.

In some embodiments, one device from each roll of devices may be updated serially. For instance, process 750 may proceed for first device 304 of first roll 302 and, upon determining that a new version of the first information passes performance test(s) 714, first device 304 may be upscaled back to first roll 302. Next, process 750 may repeat albeit with first device 314 from second roll 312 or first device 324 from M-th roll 322 (or any other roll of devices). In this way, at least one device is updated and activated with a new version of that device's roll's information. Alternatively, one device from each roll of devices may be updated with a new version of information for those devices' corresponding rolls at a substantially same time. In this particular scenario, process 750 may proceed albeit substantially in parallel for each of device of each roll. In this example, however, information tester 710 may perform the one or more performance tests 714 for each new version of information substantially in parallel. While this may employ more computing resources, in some embodiments, if successful, each roll of devices may include—after subsequent upscaling—one device that has been verified and is operational with the new version of information for that device's roll of devices.

FIG. 7C is an illustrative flowchart of another exemplary process for performing multiple device updates in parallel, in accordance with various embodiments of the present teaching. Process 780, in a non-limiting embodiment, may begin at step 782. At step 782, an instruction to update one or more devices from each roll of devices may be received. For instance, parallel updating unit 716 may receive an update remaining devices instruction from device upscaling system 430 in response to a device from each roll of devices being upscaled with a new version of information associated with that roll of devices.

At step 784, the new versions of information for each roll of devices may be obtained. In some embodiments, new version of information retriever 706 may temporary store either the data representing the new version of information or the URL/pointer to the data representing the new version of information for each roll, such that when the update remaining devices instruction is received, the previously retrieved new version of information is quickly accessible. At step 786, the current version of information may be removed from the devices. For instance, device information removal unit 704 may remove the current version of information loaded onto the one (or more) device(s) from each roll of devices. At step 788, the data representing the new version of information for each roll of devices may be loaded unto the devices in parallel. For instance, information loader 710 may load the data representing the new version of information for each device, as described above. At step 790, an upscale instruction, or instructions, may be output to indicate that each of the devices that have been updated are to be upscaled by device upscaling system 430.

Process 780 may be performed subsequent to at least one device from each roll being updated, checked, and upscaled with a new version of information for that roll. As an illustrative example, after device 304 from first roll 302 has been updated with a new version of the first information, device 314 from second roll 312 has been updated with a new version of the second information, and device 324 of M-th roll 322 has been updated with a new version of the M-th information, one or more devices from each of rolls 302, 312, and 322 may be downscaled and updated in parallel. For instance, device 306 from roll 302, device 316 from roll 312, and device 326 from roll 322 may be downscaled and updated in parallel. Of note is that, with process 780, performance test(s) 714 need not be performed as test performance check unit 712 has already determined that the new version of information for each roll is operational. However, persons of ordinary skill in the art will recognize that performance test(s) 714 may still be performed if desired.

Figure 8A:
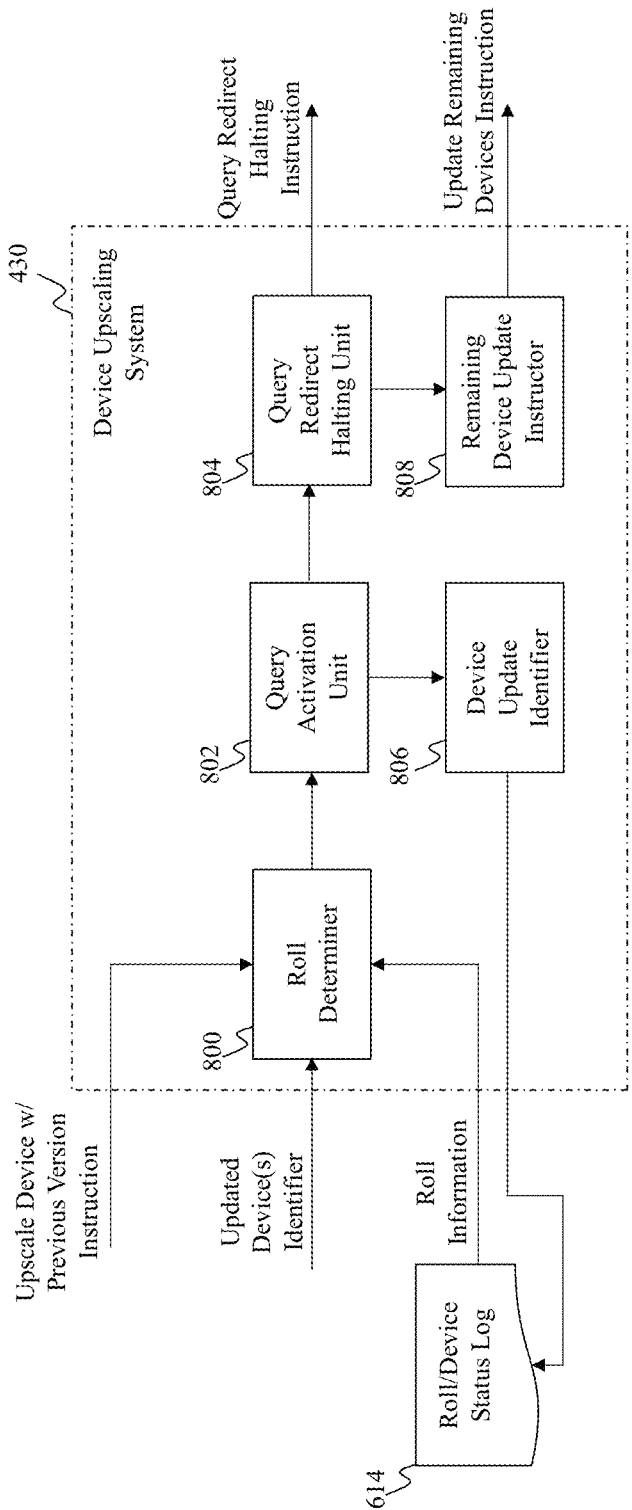
FIG. 8A is an illustrative diagram of an exemplary device upscaling system, in accordance with various embodiments of the present teaching.

FIG. 8A is an illustrative diagram of an exemplary device upscaling system, in accordance with various embodiments of the present teaching. In the illustrative embodiment, device upscaling system 430 may include a roll determiner 800, a query activation unit 802, a query redirect halting unit 804, a device update identifier 806, and a remaining device update instructor 808. Each of roll determiner 800, query activation unit 802, query redirect halting unit 804, device update identifier 806, and remaining device update instructor 808 may be implemented based on one or more computer programs (e.g., instructions) stored within memory 404 of device upscaling system 430. The particular functions of each of roll determiner 800, query activation unit 802, query redirect halting unit 804, device update identifier 806, and remaining device update instructor 808 may be realized upon execution of the one or more computer programs by processor(s) 402 of device upscaling system 430.

Roll determiner 800, in one embodiment, may be configured to receive the updated device(s) identifier from device updating system 420, indicating the one or more devices to be updated. For example, if device 304 has been updated with a new version of the first information associated with roll 302, then the updated device identifier may indicate that device 304 has passed performance test(s) 714 and is capable of responding to queries using the new version of the first information. As another example, if device 304 has been updated with a new version of the first information associated with roll 302, device 314 has been updated with a new version of the second information associated with roll 312, and device 324 has been updated with a new version of the M-th information associated with roll 322, then this may indicate that each of devices 304, 314, and 324 have been updated and passed performance test(s) 714, and therefore are capable of responding to queries using their respective new version of information. Therefore, in either example, the device or devices are to be upscaled next, and thus roll determiner 800 may determine which roll to upscale each device to based on roll information obtained from roll/device status log 614, as described above. Furthermore, in some embodiments, in response to one or more devices from each roll of devices being updated with their corresponding new versions of information in parallel, the updated devices identifier received by roll determiner 800 may cause roll determiner 800 to obtain roll information for each roll to be used for upscaling each of the one or more devices to their corresponding rolls of devices substantially in parallel.

In some embodiments, if one or more of performance tests 714 are not passed, then the corresponding devices may need to revert to their previous version of information. In this particular scenario, roll determiner 800 may receive an upscale device with previous version instruction from previous information loading unit 720. Roll determiner 800 may then determine the corresponding roll that the device, or devices, with which are to be upscaled with their previous versions of information.

Query activation unit 802 may be configured to activate devices responsive to receiving roll information for those devices from roll determiner 800. Query activation unit 802 may activate devices that have been updated with new versions of information, as well as may activate devices that have been reverted to a previous version of information. As described herein, a device may be "activated" by allowing incoming queries to be directed to that device such that that device may respond to the incoming queries.

In response to query activation unit 802 activating one or more devices, device update identifier 806 may send updated device activity information to roll/device status log 614. Therefore, roll/device status log 614 may continually track, and be aware of, which devices have been activated, updated, deactivated, and so on.

Furthermore, in response to query activation unit 802 activating the one or more devices, query activation unit 802 may notify query redirect halting unit 804 to generate an output a query redirect halting instruction. In some embodiments, a device that is activated may be removed from a restricted listing of query director 300 such that query director 300 is capable of forwarding incoming queries to that device, if the query is capable of being serviced by the information stored by that device. The query redirect halting instruction generated and output by query redirect halting unit 804 may be provided to query director 300, which therefore may updating its listing of active devices to indicate that the one or more devices have been updated and activated.

Remaining device update instructor 808 may be configured, upon notification from query redirect halting unit 804 that the one or more devices have been activated, may generate and send an update remaining devices instruction to device downscaling system 410. For instance, in response to at least one device from each roll being updated and upscaled with the new version of that device's corresponding information (e.g., new version of first information associated with roll 302, new version of second information associated with roll 312, etc.), remaining device update instructor 808 may facilitate one or more additional devices from each roll to begin the process of being updated in parallel. Therefore, upon output of the update remaining devices instruction, remaining device update instructor 808 may begin the second stage of updating, whereby one or more devices from each roll are updated.

As an illustrative example, after device 304 is updated with a new version of the first information associated with first roll 302, device upscaling system 430 may upscale first device 304 back to roll 302. Upon being upscaled, device 314 of roll 312 may be downscaled, updated, and then upscaled. This process (e.g., first stage of updating) may continue until at least one device from each roll of devices is updated with their corresponding new version of information. At this point, since each roll includes at least one updated and upscaled device, the process of parallel updating may commence (e.g., second stage of updating) in response to the update remaining devices instruction being output. Here, one or more devices from each roll may be downscaled, updated, and upscaled substantially in parallel. For instance, device 306 of roll 302, device 316 of roll 312, and device 326 of roll 322, may be downscaled at a substantially same time, updated with their corresponding new version of information, and then updated to their respective rolls of devices upon completion of the updating. Alternatively, devices 306 and 308 of roll 302, devices 316 and 318 of roll 312, and devices 326 and 328 of roll 322 (or more from each roll) may be downscaled, updated, and then upscaled, as described previously.

Figure 8B:
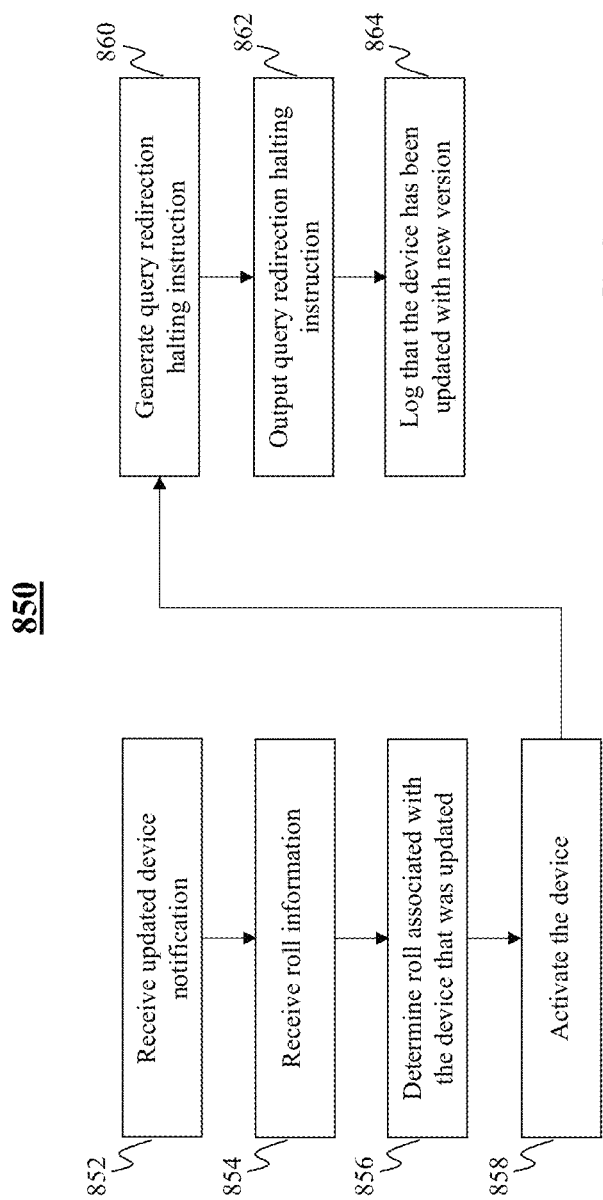
FIG. 8B is an illustrative flowchart of an exemplary process for upscaling a device, in accordance with various embodiments of the present teaching.

FIG. 8B is an illustrative flowchart of an exemplary process for upscaling a device, in accordance with various embodiments of the present teaching. Process 850, in a non-limiting embodiment, may begin at step 852. At step 852, an updated device notification may be received. For instance, roll determiner 800 may receive an updated device notification indicating that a device, or devices, have been updated with a new version of information. At step 854, roll information may be received. The roll information may be received by roll determiner 800 from roll/device status log 614, and may indicate which roll a particular device belongs to. At step 856, the roll associated with the device, or devices, which was/were updated may be determined. For instance, roll determiner 800 may determine the roll based on the roll information obtained from roll/device status log 614.

At step 858, the device, or devices, may be activated. For instance, query activation unit 802, upon receiving an indication of the roll(s) associated with the updated device(s), may activate the device(s). In other words, the device(s) may be allowed to receive and/or respond to incoming queries serviceable by that device. At step 860, a query redirection halting instruction may be generated. For instance, query redirect halting unit 804 may generate the query redirecting halting instruction, which may cause query director 300 to stop redirecting queries from the activated device(s). At step 862, the query redirection halting instruction may be output. At step 864, the device that has been updated with its corresponding new version of information may be logged. For instance, device update identifier 806 may update the activity status of the corresponding device(s) activated by updating the information logged by roll/device status log 614.

Figure 8C:
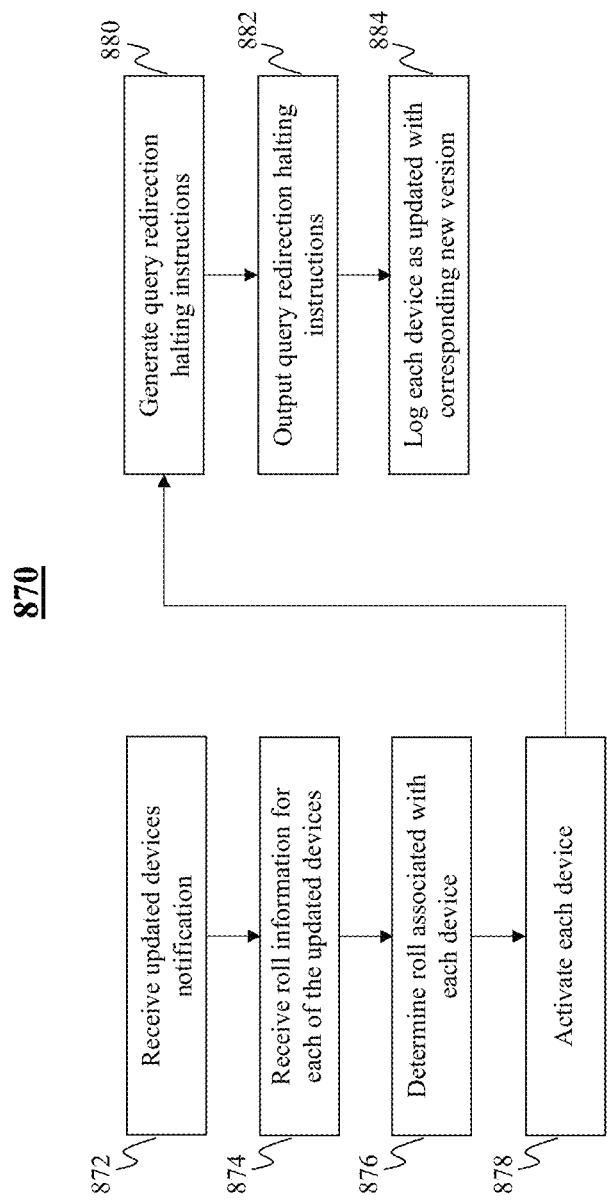
FIG. 8C is an illustrative flowchart of an exemplary process for upscaling multiple devices, in accordance with various embodiments of the present teaching.

FIG. 8C is an illustrative flowchart of an exemplary process for upscaling multiple devices, in accordance with various embodiments of the present teaching. Process 870, in a non-limiting embodiment, may begin at step 872. At step 872, an updated devices notification may be received. In some embodiments, step 872 of FIG. 8C may be substantially similar to step 852 of FIG. 8B, with the exception that the updated devices notification of step 872 may refer to a notification that one or more devices from each roll of devices have been updated (e.g., second stage of updating). At step 874, roll information for each of the updated devices may be received. At step 876, a roll associated with each of the devices may be determined. For example, roll determiner 800 may receive roll information from roll/device status log 614, and may determine which devices correspond to which rolls of devices based on the roll information.

At step 878, each device may be activated. For instance, query activation unit 802 may activate each of the one or more devices of each roll that have been updated, as indicated by step 872. In some embodiments, each device may be activated at a substantially same time (e.g., in parallel). At step 880, query redirection halting instructions may be generated. At step 882, the query redirection halting instructions may be output. At step 884, each device may be logged as having been updated with a corresponding new version of that device's respective information. In some embodiments, steps 880-884 of FIG. 8C may be substantially similar to steps 860-864 of FIG. 8B with the exception that steps 880-884 correspond to the one or more devices being upscaled in parallel.

Figure 9:
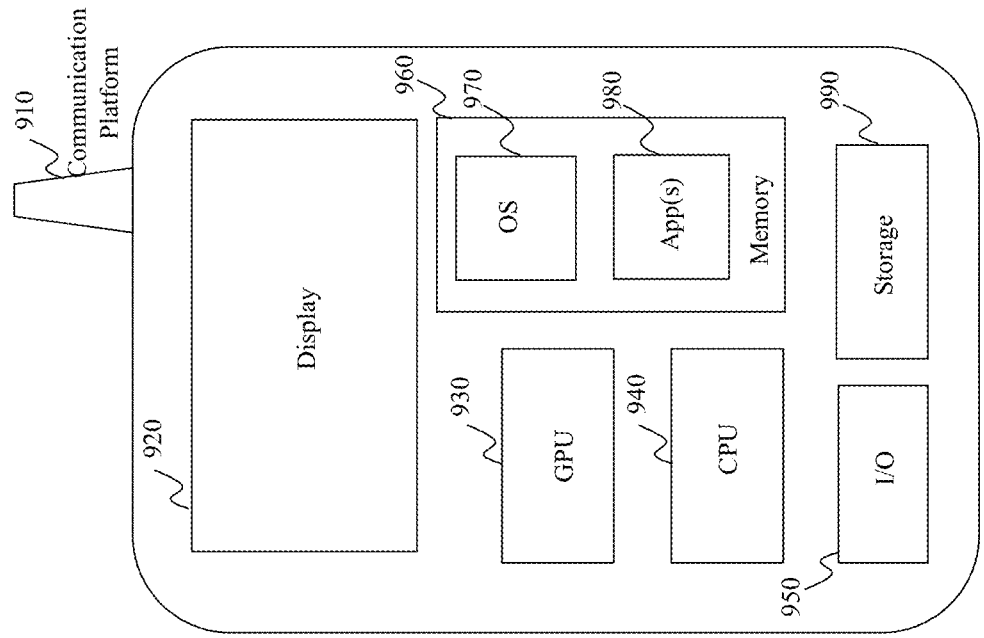
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user devices (e.g., user devices 210), the host devices (e.g., devices 302-328), and/or information update system 240 on which the information update systems and methods is implemented corresponds to a mobile device 900, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 940. In some embodiments, CPU units 940 and GPUs 930 may be substantially similar to processor(s) 402, memory 960 and storage 990 may be substantially similar to memory 404, and communication platform 910 may be substantially similar to communications platform 406, and the previous descriptions may apply. Any other suitable component, including but not limited to a system bus or a controller (not shown), may also be included in the mobile device 900. As shown in FIG. 9 a mobile operating system 970 (e.g., iOS, Android, Windows Phone, etc.), and one or more applications 980 may be loaded into memory 960 from storage 990 in order to be executed by the CPU 940. The applications 980 may include a browser or any other suitable mobile apps for carrying out information update on mobile device 900. User interactions with the content may be achieved via the I/O devices 940 and provided to the information update system 240 via network(s) 220.

To implement various modules, units, and their functionalities described in the present disclosure, computer hardware platforms may be used as the hardware platform(s) for one or more of the elements described herein (e.g., information update system 240). The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
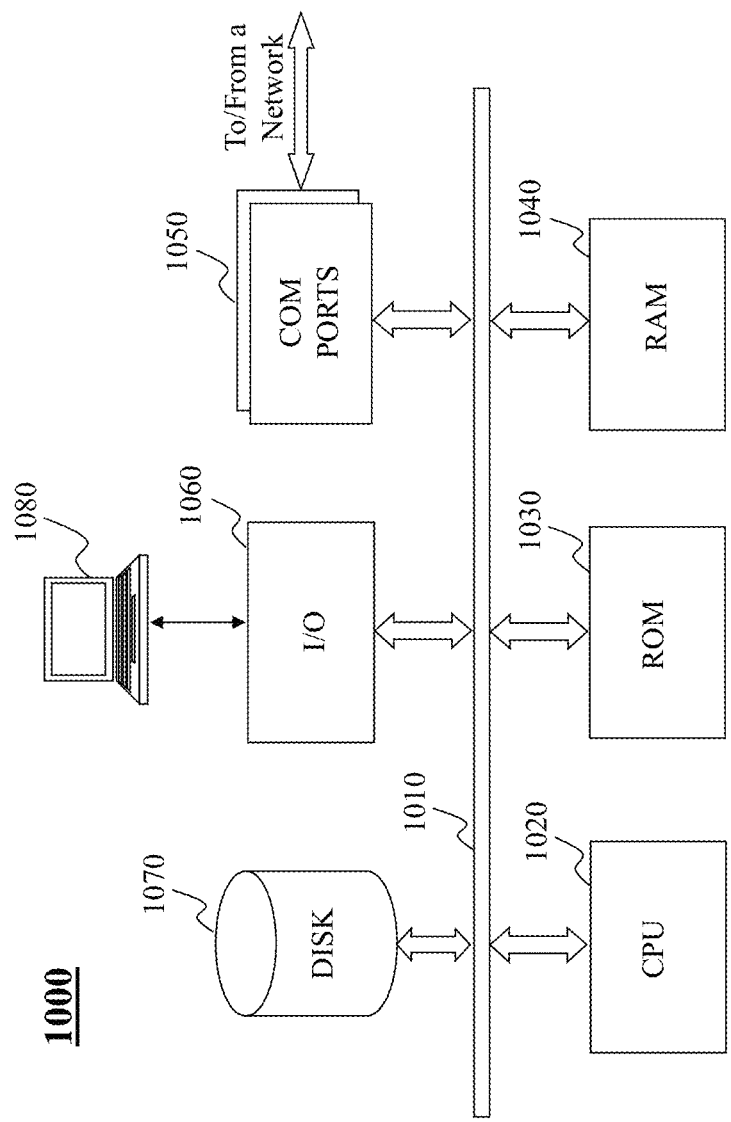
FIG. 10 is an illustrative diagram of an exemplary computing device architecture that may be used to realize a specialized system implementing the present teaching in accordance with various embodiments.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1000 may be used to implement any component of information update techniques, as described herein. For example, the information update system 240 as described herein may be implemented on a computer such as computer 1000, via its hardware, software program, firmware, or a combination thereof. Although only one such computer is shown, for convenience, the computer functions relating to information update as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 1000 also includes an I/O component 1060, supporting input/output flows between the computer and other components therein such as user interface elements 1080. Computer 1000 may also receive programming and data via network communications. In some embodiments, CPU units 1020 may be substantially similar to processor(s) 402, disk 1070, ROM 1030, and/or RAM 1040 may be substantially similar to memory 404, and I/O component 1060 may be substantially similar to communications platform 406, and the previous descriptions may apply.

Hence, aspects of the methods of information update and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information update system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the information update techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for performing system updates implemented on at least one machine each having at least one processor, memory, and a communication platform connected to a network, the method comprising:
   downscaling a first device from each of a plurality of rolls of devices, wherein each roll of devices is configured with information associated with that roll;
   updating each first device with a new version of the information associated with a corresponding roll of devices;
   upscaling each first device to the corresponding roll of devices;
   downscaling, in parallel and in response to each first device being upscaled, one or more additional devices from each of the plurality of rolls of devices;
   updating, in parallel and in response to each of the one or more additional devices being downscaled, each of the one or more additional devices with the new version of information associated with the corresponding roll of devices; and
   upscaling each of the one or more additional devices to the corresponding roll of devices, wherein downscaling a device comprises preventing the device from responding to a query, and wherein upscaling a device comprises allowing the device to respond to a query.

2. The method of claim 1, wherein downscaling the first device from each of the plurality of rolls of devices comprises:
   downscaling an initial device from a first roll of devices of the plurality of rolls of devices; and
   downscaling each first device of each remaining roll of devices of the plurality of rolls of devices, serially, after the initial device has been updated with the new version of the information associated with the first roll of devices and upscaled to the first roll of devices.

3. The method of claim 1, wherein:
   downscaling the first device comprises preventing the first device from receiving queries, responding to queries, or both receiving queries and responding to queries; and
   upscaling the first device comprises enabling the first device to receive queries, respond to queries, or both receive queries and respond to queries.

4. The method of claim 1, further comprising:
   determining, prior to the first device being downscaled, that the new version of the information is stored within a database such that the first device is downscaled in response to the new version of the first information being detected.

5. The method of claim 1, further comprising:
   performing, prior to upscaling each first device to the corresponding roll of devices, one or more tests to determine that the new version of the information is operational, wherein upscaling each first device is responsive to the one or more tests indicating that the new version of the information is operational.

6. The method of claim 1, wherein downscaling the first device from each of the plurality of rolls of devices comprises:
   downscaling an initial device from a first roll of devices configured with first information, the first information being at least a portion of the information associated with devices within the first roll of devices;
   loading a new version of the first information to the initial device;
   performing one or more tests to the initial device;
   determining that the new version of the information fails the one or more tests;
   loading the first information to the initial device; and
   upscaling the initial device configured with the first information to the first roll of devices.

7. The method of claim 1, wherein updating, in parallel and in response to each of the one or more additional devices being downscaled, each of the one or more additional devices with the new version of information associated with the corresponding roll of devices comprises:
   loading each of the one or more additional devices with the new version of the information such that the one or more additional devices are available for upscaling at a substantially same time.

8. A system for performing system updates, comprising:
   a device downscaling system configured to downscale a first device from each of a plurality of rolls of devices, wherein each roll of devices is configured with information associated with that roll;
   a device updating system configured to update each first device with a new version of the information associated with a corresponding roll of devices; and
   a device upscaling system configured to upscale each first device to the corresponding roll of devices, wherein:

the device downscaling system is further configured to downscale, in parallel and in response to each first device being upscaled, one or more additional devices from each of the plurality of rolls of devices;

the device updating system is further configured to update, in parallel and in response to each of the one or more additional devices being downscaled, each of the one or more additional devices with the new version of information associated with the corresponding roll of devices; and the device upscaling system is further configured to upscale each of the one or more additional devices to the corresponding roll of devices, wherein downscaling a device comprises preventing the device from responding to a query, and wherein upscaling a device comprises allowing the device to respond to a query.

9. The system of claim 8, wherein the device downscaling system is configured to:

downscale an initial device from a first roll of devices of the plurality of rolls of devices; and downscale each first device of each remaining roll of devices of the plurality of rolls of devices, serially, after the initial device has been updated with the new version of the information associated with the first roll of devices and upscaled to the first roll of devices.

10. The system of claim 8, wherein:

the device downscaling system comprises a device deactivation unit configured to downscale the first device by preventing the first device from receiving queries, responding to queries, or both receiving queries and responding to queries; and the device upscaling system comprises a device activation unit configured to upscale the first device comprises enabling the first device to receive queries, response to queries, or both receive queries and respond to queries.

11. The system of claim 8, further comprising:

a new information detection system configured to determine, prior to the first device being downscaled, that the new version of the information is stored within a database such that the first device is downscaled in response to the new version of the first information being detected.

12. The system of claim 8, wherein the device updating system comprises:

a test performance check unit configured to perform, prior to upscaling each first device to the corresponding roll of devices, one or more tests to determine that the new version of information is operational, wherein each first device is upscaled responsive to the one or more tests indicating that the new version of information is operational.

13. The system of claim 8, wherein the device downscaling system is further configured to downscale an initial device from a first roll of devices configured with first information, the first information being at least a portion of the information associated with devices within the first roll of devices, the device updating system further comprises:

an information loading unit configured to load new version of the first information to the initial device;

an information tester configured to perform one or more tests to the initial device;

a test performance check unit configured to determine that the new version of the information fails the one or more tests; and a previous information loading system configured to load the first information to the initial device, wherein the device upscaling system is further configured to upscale the initial device configured with the first information to the first roll of devices.

14. The system of claim 8, wherein the device updating system comprises:

a parallel updating unit configured to cause each of the one or more additional devices to be updated with the new version of information associated with the corresponding roll of devices in parallel and in response to each of the one or more additional devices being downscaled; and an information loading unit configured to load each of the one or more additional devices with the new version of the information such that the one or more additional devices are available for upscaling at a substantially same time.

15. A non-transitory computer readable medium for performing system updates comprising instructions that, when executed by at least one processor of a computing system, effectuate operations comprising:

downscaling a first device from each of a plurality of rolls of devices, wherein each roll of devices is configured with information associated with that roll;

updating each first device with a new version of the information associated with a corresponding roll of devices;

upscaling each first device to the corresponding roll of devices;

downscaling, in parallel and in response to each first device being upscaled, one or more additional devices from each of the plurality of rolls of devices;

updating, in parallel and in response to each of the one or more additional devices being downscaled, each of the one or more additional devices with the new version of information associated with the corresponding roll of devices; and upscaling each of the one or more additional devices to the corresponding roll of devices, wherein downscaling a device comprises preventing the device from responding to a query, and wherein upscaling a device comprises allowing the device to respond to a query.

16. The non-transitory computer readable medium of claim 15, wherein:

the first device being downscaled comprises preventing the first device from receiving queries, responding to queries, or both receiving queries and responding to queries; and the first device being upscaled comprises enabling the first device to receive queries, response to queries, or both receive queries and respond to queries.

17. The non-transitory computer-readable medium of claim 15, wherein the operations further comprise:

determining, prior to the first device being downscaled, that the new version of the information is stored within a database such that the first device is downscaled in response to the new version of the first information being detected.

18. The non-transitory computer-readable medium of claim 15, wherein the operations further comprise:

performing, prior to upscaling each first device to the corresponding roll of devices, one or more tests to determine that the new version of the information is operational, wherein upscaling each first device is responsive to the one or more tests indicating that the new version of the information is operational.

19. The non-transitory computer-readable medium of claim 15, wherein downscaling the first device from each of the plurality of rolls of devices comprises:
- downscaling an initial device from a first roll of devices configured with first information, the first information being at least a portion of the information associated with devices within the first roll of devices;
- loading new version of the first information to the initial device;
- performing one or more tests to the initial device;
- determining that the new version of the information fails the one or more tests;
- loading the first information to the initial device; and
- upscaling the initial device configured with the first information to the first roll of devices.

20. The non-transitory computer-readable medium of claim 15, wherein updating, in parallel and in response to each of the one or more additional devices being downscaled, each of the one or more additional devices with the new version of information associated with the corresponding roll of devices comprises:
- loading each of the one or more additional devices with the new version of the information such that the one or more additional devices are available for upscaling at a substantially same time.

* * * * *